US012763942B2

(12) United States Patent
Keidar et al.

(10) Patent No.: US 12,763,942 B2
(45) Date of Patent: Oct. 13, 2026

(54) SECURE KEY DELIVERY

(71) Applicant: Nvidia Corporation, Santa Clara, CA (US)

(72) Inventors: Ron Keidar, San Diego, CA (US); Xinxing Hu, Shanghai City (CN); Hye Su Lee, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 19/050,538

(22) Filed: Feb. 11, 2025

(65) Prior Publication Data

US 2026/0197168 A1 Jul. 9, 2026

(30) Foreign Application Priority Data

Jan. 7, 2025 (WO) ................ PCT/CN2025/070939

(51) Int. Cl.
*H04L 9/08* (2006.01)
*H04L 9/32* (2006.01)

(52) U.S. Cl.
CPC ............ *H04L 9/0869* (2013.01); *H04L 9/085* (2013.01); *H04L 9/088* (2013.01); *H04L 9/0891* (2013.01); *H04L 9/0894* (2013.01); *H04L 9/3247* (2013.01)

(58) Field of Classification Search
CPC ....... H04L 9/0969; H04L 9/085; H04L 9/088; H04L 9/0891; H04L 9/0894;
(Continued)

(56) References Cited

U.S. PATENT DOCUMENTS 7,831,051 B2 11/2010 Zunke
11,968,295 B2 4/2024 Migault et al.
(Continued)

OTHER PUBLICATIONS

IEEE Standard for Information Technology—Telecommunications and Information Exchange Between Systems—Local and Metropolitan Area Networks—Specific Requirements—Part 11. Retrieved from https://standards.ieee.org/ieee/802.11 i/3127/ (Year: 2004).*
Security Protocol and Data Model (SPDM) Specification (2022). Distributed Management Task Force, Inc. (DMTF). Retrieved from https://www.dmtf.org/sites/default/files/standards/documents/DSP027 4 1.2.1.pdf (Year: 2022).*
(Continued)

*Primary Examiner* — Brian F Shaw
(74) *Attorney, Agent, or Firm* — Hogan Lovells Cadwalader US LLP

(57) ABSTRACT

Approaches in accordance with various illustrative embodiments provide for the encryption of communications going into and out of a device, such as a chip or proprietary bus. The encryption can occur in a central Root-of-Trust (RoT), which can include agents for individual communication protocols to generate session keys used to encrypt communications for individual sessions, and the data can be sent to a crypto engine for the respective communication protocol. A key tunnel unit can be used to receive a wrapped session key over the public bus and then unwrap the key in hardware, then able to then transmit the unwrapped session key to the corresponding crypto engine without exposing the session key to software executing on the device outside the RoT. A nonce can be used with a current derivation key, of a set of ephemeral keys, to generate a new set of ephemeral keys to be used to perform various cryptographic operations, allowing for secure rotation of wrapping keys, as well as other keys such as derivation and message keys.

20 Claims, 13 Drawing Sheets

(58) Field of Classification Search
CPC ... H04L 9/3247; H04L 9/0816; H04L 9/0822; G06F 21/57; G06F 21/64
See application file for complete search history.

(56) References Cited

U.S. PATENT DOCUMENTS

| | | | | |
|---|---|---|---|---|
| 2008/0063209 | A1 | 3/2008 | Jaquette et al. | |
| 2010/0042841 | A1* | 2/2010 | King | H04L 9/0891 380/255 |
| 2015/0319166 | A1* | 11/2015 | Arnold | H04L 9/3234 713/159 |
| 2016/0188889 | A1* | 6/2016 | Narendra Trivedi | G06F 21/6218 713/189 |
| 2017/0329994 | A1* | 11/2017 | Le Roy | G06F 21/64 |
| 2021/0176632 | A1 | 6/2021 | Liu et al. | |
| 2022/0141026 | A1 | 5/2022 | Smith et al. | |

OTHER PUBLICATIONS

Third Party Observations issued in EP Patent Application No. 24159411.8 dated Feb. 11, 2026.
Communication issued in EP Patent Application No. 24159411.8 dated Mar. 16, 2026.
European Search Report issued in corresponding EP Application No. 24159411.8, dated Jul. 12, 2024.
Han et al., "Scalable and Secure Virtualization of HSM With ScaleTrust", IEEE/ACM Transactions on Networking, vol. 31, No. 4, Aug. 2023, pp. 1595-1610, XP011947062, doi: 10.1109/TNET.2022.3220427.
Non-Final Office Action issued in U.S. Appl. No. 18/186,442, dated Dec. 13, 2024.
Corrected Notice of Allowability issued in U.S. Appl. No. 18/186,442, dated May 7, 2025.
Corrected Notice of Allowability issued in U.S. Appl. No. 18/186,442, dated May 17, 2025.

* cited by examiner

SECURE KEY DELIVERY

CROSS-REFERENCE TO RELATED APPLICATIONS

This application claims priority to PCT Application Serial No. PCT/CN2025/070939 filed Jan. 7, 2025, and entitled "SECURE KEY DELIVERY," which is hereby incorporated herein in its entirety and for all purposes.

TECHNICAL FIELD

This disclosure relates generally to the encryption of data, and in particular to encryption of communications going into and out of a device, such as a chip or proprietary bus.

BACKGROUND

As data security becomes increasingly important, there is movement toward encrypting most, if not all, of the communications going into, or out of, a computing device or system-on-chip (SoC). For various communications interfaces, a central Root-of-Trust (RoT) needs to send encryption keys to the crypto engines of those interfaces. The delivery of those keys raises various potential issues, as the crypto engines are typically located at the edge of the die (next to the pads or soldering points out of the silicon) and the distance from RoT is significant, making dedicated wires or a dedicated bus for key delivery too expensive in many instances. Sending the keys over a public bus can avoid the expense of a dedicated wire or bus, but increases the risk of attacks on a bus optimized for performance and not security. Further, a micro-controller unit (MCU) managing the crypto engines is typically limited in its ability to perform a standard security protocol (e.g., TLS) with the RoT. The MCUs are also typically not trusted, so even if an MCU can handle secure delivery it should have no access to the value of those keys. Use of keys over extended periods of time may constitute security risks in the event a key is compromised, but rotating keys can be challenging and can also introduce various security risks in various systems.

BRIEF DESCRIPTION OF THE DRAWINGS

Various embodiments in accordance with the present disclosure will be described with reference to the drawings, in which.

DETAILED DESCRIPTION

Figure 1:
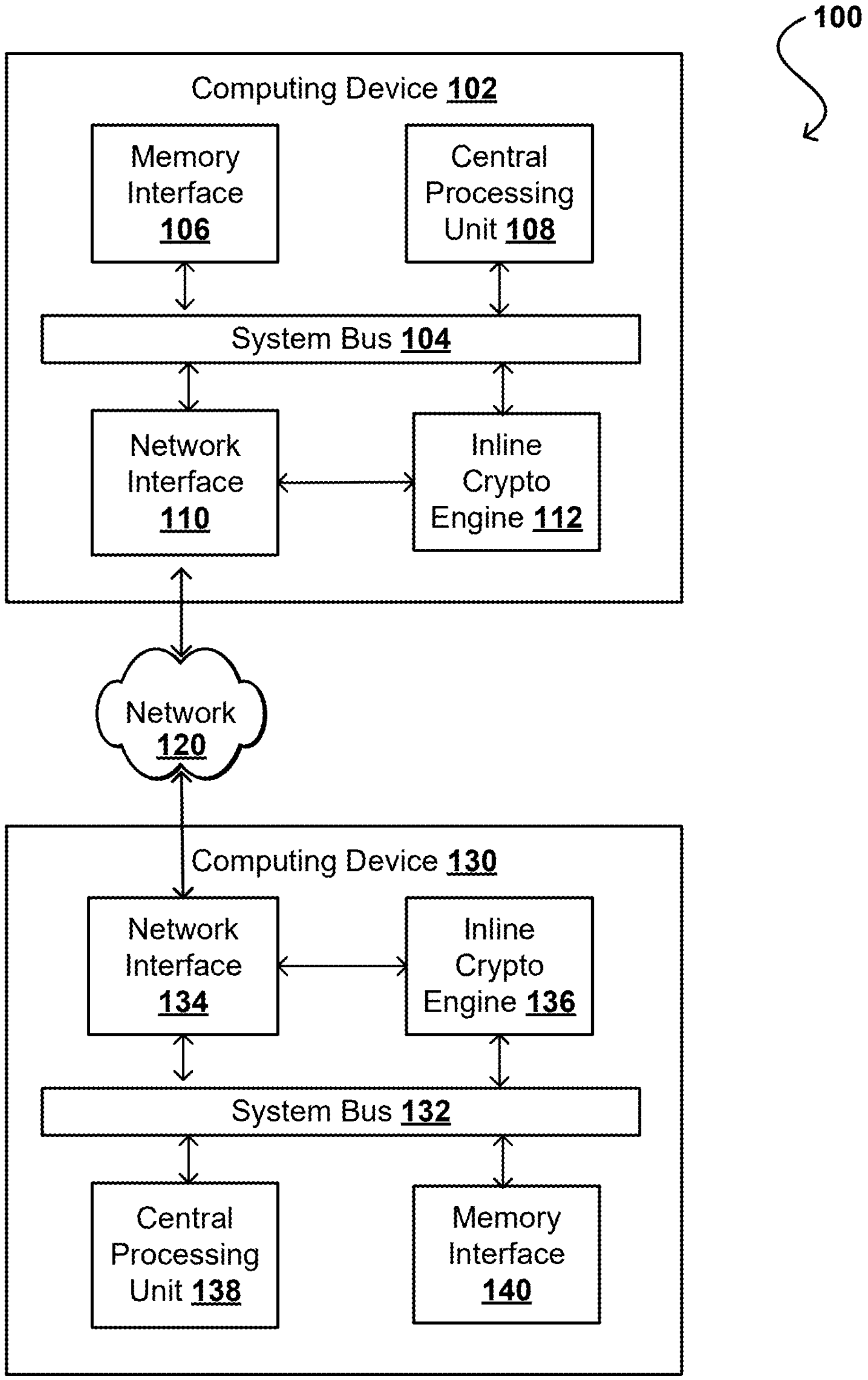
FIG. 1 illustrates an example system allowing for secure network communication between devices that can be used to implement aspects of various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various illustrative embodiments provide for the encryption of communications going into and out of a device, such as a chip or a proprietary bus. The encryption can occur in a central Root-of-Trust (RoT), such as may correspond to at least one secure processor, which can include or host one or more agents for individual communication protocols to generate session keys used to encrypt communications for individual sessions, and the data can be sent to a crypto engine for the respective communication protocol on the device. Because there can be a significant distance between the RoT and the crypto engine, it can be beneficial to use an existing public bus to send the data rather than using a dedicated bus or wire for key delivery. In order to minimize the likelihood of exposure of the key when sent over a public bus, each session key can be wrapped (e.g., encrypted) within the RoT using a wrapping key. A hardware block (as may correspond to or provide a "key tunnel unit" (KTU)) can be used to receive a wrapped session key over the public bus and then unwrap the key in hardware, being able to then transmit the unwrapped session key to the corresponding crypto-engine without exposing the session key to software executing on the device outside the RoT. The receiving inline crypto engine (or other inline encryption hardware) can then use that session key to encrypt session data to be transmitted to a separate device or destination.

In order to establish a shared secret, an initial wrapping key can be sent over a public bus to the KTU, followed by a first wrapping key that is wrapped by the initial wrapping key (which may have been exposed due to transmission over the public bus). A second wrapping key can be sent that is wrapped using the first wrapping key, and the second wrapping key (once unwrapped) can become the current wrapping key to be used to wrap session keys. This process can continue for a series of wrapping keys sent before any session keys are sent, in order to reduce a likelihood that someone intercepting the initial wrapping key sent over the public bus will be able to intercept and unwrap any or all of the sequence of wrapping keys. Once one or more wrapping keys has been sent, a current (or most recently sent or received) wrapping key can be used to wrap or encrypt one or more session keys sent subsequent to the current wrapping key, and those encrypted session keys can then be transmitted over a public system bus. An IP block, or key tunnel unit, can then unwrap the session key(s) in hardware for use in encrypting data to be transmitted to another device. The wrapping keys can be rotated over time as well, such as to send a new wrapping key after a period of time or number of session keys.

In at least one embodiment, an initial key (e.g., a per-package pairing key (P3K) available to the RoT and each KTU) can be provided to a software agent executing on a secure processor (e.g., the RoT), as well as one or more KTUs. The initial key can be established in a number of different ways, such as by being provisioned at production, written in RTL, or otherwise established using a key-exchange algorithm or other such approach. The P3K can be used with a nonce (i.e., a random number of at least minimum length) to derive (using cryptographic derivation) an initial set of ephemeral keys. This set may include a number of ephemeral keys, where individual keys may be used for different purposes. Such a set can include an ephemeral wrapping key (EWK) for wrapping or encrypting data to be transmitted, an ephemeral message key (EMK) for use in sending messages between the RoT and a KTU, and an ephemeral derivation key (EDK) to be used to derive future keys. When a key rotation is to be performed, a RoT can generate a new nonce and use the current derivation key (EDK)—instead of the P3K—to generate a new set of ephemeral keys. The nonce can be sent to a KTU, which can also generate the same set of new ephemeral keys using the nonce and the current ephemeral derivation key (EDK). In some embodiments, the nonce can be signed using the new EMK, generated by the RoT, and the KTU can then compare this signature against a signature separately generated in the KTU using the newly-generated EMK in order to attempt to verify the signature on the message. The signature must be verified in at least one embodiment adopting the new ephemeral keys. Once the new ephemeral keys are adopted, the old ephemeral keys will no longer be valid. To further enhance security, messages can have a count applied by a monotonic counter so that messages must be received and processed in order. The count can be reset with each key rotation to avoid issues with large counts or rollovers.

Variations of this and other such functionality can be used as well within the scope of the various embodiments as would be apparent to one of ordinary skill in the art in light of the teachings and suggestions contained herein.

FIG. 1 illustrates a system 100 allowing for secure network communication between devices that can be used to implement aspects of various embodiments. In this example, a first computing device 102 is to securely exchange or communicate data with a second computing device 130 over at least one network. The computing devices can be similar or different devices, and may include any appropriate devices capable of performing operations such as encrypting, decrypting, transmitting, receiving, and/or processing data. Such devices may include, for example, servers, desktop computers, or compute instances, among other such options. These devices can include processors (such as one or more central processing units (CPUs) 108, 138 or graphics processing units (GPUs) and memory that can connect to a central system bus 104, 132 using a memory interface 106, 140, and can communicate with the network 120 using respective network interfaces 110, 134. The network(s) 120 may include any appropriate wired and/or wireless network, as may include the Internet, a cellular network, an ethernet, a local area network (LAN), or a peer-to-peer network, among other such options.

These devices 102, 130 can establish a secure communication path between them even if the path is across a public or otherwise unsecure network 120. In at least one embodiment, this can include performing a control, secret. or key exchange. This exchange may occur in accordance with a key management protocol supported by each device, which may be specified by the device 102 attempting to establish the secure communication path. The key management protocol can be managed by one or more trusted components that operate in a trusted zone or portion of the device typically referred to as a root of trust (RoT), which can correspond to a secure processor or set of secure components on each device. This can include, for example, inline secure hardware such as an inline crypto engine 112, 136 on each device. These trusted components can exchange protocol information during a key establishment phase. After authentication of both devices, these devices can exchange data and configuration information, and can agree on a session key that is unique for a specific communication session. One of the devices can go to the data plane, which can encrypt and decrypt data, provide the session key to be used for the current session. In some embodiments, the data plane encryption component(s) will not be a separate component or have high throughput, although for low level encryption the data plane might be separate or capable of high throughput that might require its own space and hardware implementation. In at least one embodiment, an inline crypto engine managing the data plane will need to be very close to the location of the RoT, as may be embedded near the pins. The inline crypto engines 112, 136 on the devices 102, 130 can perform operations such as a protocol exchange or key exchange to establish keys within this root of trust.

As mentioned, the distance to the inline crypto engine from an RoT can be important for at least some devices. If keys are to be delivered to something nearby, or over a short distance, then one or more additional wires could be used to transmit the data. For large, modern chips, however, the distance over which the keys may need to be transmitted can be significant, and might even involve separate dies in a single package. It is still beneficial to be able to protect the keys as they are transmitted from this root of trust to the inline encryption engine (such as an ICE-based key tunnel unit (KTU)), regardless of the distance the keys are to travel.

Figure 2:
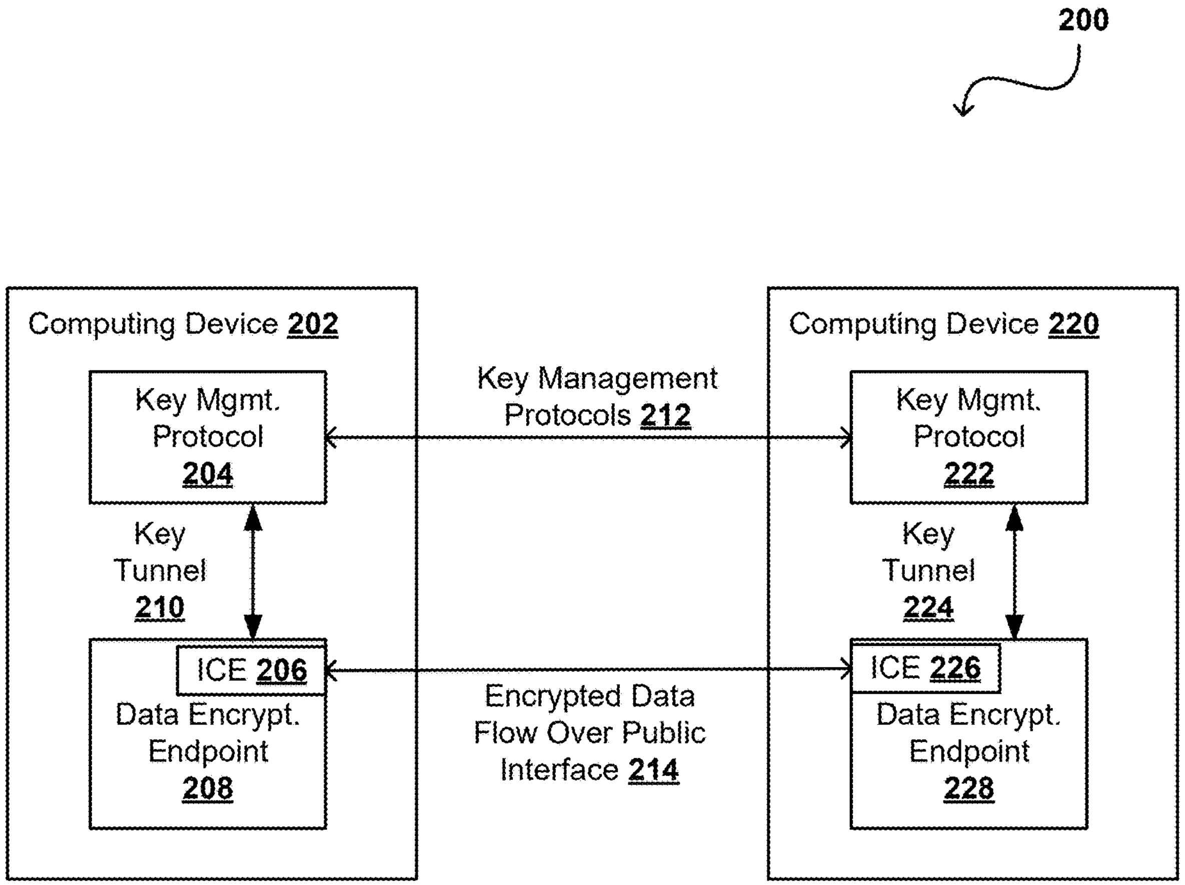
FIG. 2 illustrates an example communication of session keys between devices, which can be used in accordance with various embodiments.

One approach that can be used to secure data transmitted over a communication channel is to use a shared secret. FIG. 2 illustrates an example implementation 200 that can be used to securely manage such shared secrets in accordance with at least one embodiment. A public interface 214 between the two devices can support data plane encryption, where data to be transmitted is encrypted on a first device 202 and then transmitted over the public interface 214 to a second device 220, which has the shared secret and can then decrypt the data. In at least one embodiment, standard data plane protocols can be used to protect the data. The same, or separate, communication channel can be used to exchange information relating to the key management protocols 212, such as to specify on or agree to the (e.g., standard) key management protocols to be used to protect the session keys to be used for one or more sessions.

In this example, a key management protocol component 204 on the initiating computing device 202 is to provide for key delivery within the computing device 202, such as within a system on chip (SoC). This communication can involve communicating a session key to an inline crypto engine (ICE) 206 that may be a significant distance from the key management protocol component 222 on the first device 202. In this example, a (virtual) key tunnel 210 can be used to protect the key delivery inside the SoC, where those keys are to be used to encrypt or decrypt data within the first device 202. The key tunnels 210, 224 can support a proprietary or non-public implementation. A key tunnel 210 can be responsible for moving session keys from the root of trust, such as a trusted agent that supports the key management protocol 204, to a remote engine, such as an ICE 206.

As mentioned the distance between the RoT and the ICE may be significant, so it may be undesirable to add or use one or more dedicated wires for the key tunnel. Using a publicly accessible bus does not provide adequate trust when delivering keys, particularly keys in plaintext. Further, the ICE 206 may use a local controller or microcontroller that is not trusted and, as such, should not have access to the session keys or other shared secrets. An approach in accordance with at least one embodiment can prevent the microcontroller from having access to the keys in unencrypted form, and can instead ensure that the microcontroller only receives encrypted keys over the key tunnel and can push those encrypted keys into the ICE 206, or other encryption hardware, without having access to the unencrypted session keys. The root of trust will typically have the ability to encrypt keys, and the ICE can receive the encrypted keys through the key tunnel unit 364 (in hardware), and can unwrap and decrypt the keys in such a way that the key in plaintext is only visible to the ICE engine in the hardware, without the keys being exposed to the software. In at least one embodiment, the plaintext key will be sent very early during an early execution process (e.g., boot or production), such that its exposure will be limited because there should not be any non-boot-related applications or processes running on the device at that point. In an embodiment using an RTL key, for example, there may be a pre-shared secret stored such that there is no need to send an initial plaintext key.

In at least one embodiment, the hardware can inspect (e.g., passively check the correctness of a software input) the behavior of the software, and if the software attempts to perform an unauthorized operation such as to skip a key, insert a key twice, or change a key, for example, the hardware will detect the attacks and ensure that it will not accept those modified keys through modification attacks. The root of trust can therefore determine that it can trust the key tunnel hardware because the local microcontroller is not permitted to access or modify the keys or other secret information, and that the RoT will also be able to determine any time keys are modified, one or more counters 358 are incremented, or other such actions occur. The counters can be used in at least one embodiment to ensure that key identifiers are monotonically increasingly, where any gaps or reuse of key identifiers can be indicative of a wrapped key being reused or skipped. A key tunnel 224 can perform similar operations on the second device 220, providing a secure path between an agent (supporting the key management protocol 222) of the root of trust and an ICE 226 on the device. As mentioned, the keys can be used to encrypt data to be transmitted over the public interface 214 using data encryption endpoints 208, 228 on the devices that are parties to the communication.

In at least one embodiment, the root of trust includes an IP block that can unwrap keys in hardware and send them to the hardware of the crypto engine without exposing the keys to the software executing on the device. Session keys can be wrapped by the root of trust using wrapping keys, and this wrapping can be performed in a trusted environment. Because the session keys will be wrapped, there is no need for a dedicated bus between the root of trust and the encryption hardware. By wrapping the keys at the RoT and enabling the keys to be unwrapped at the key tunnel 210, the wrapped keys can be delivered on public busses without risk of exposure. The respective microcontroller unit (MCU) does not need to perform any complex operations, as these operations can be offloaded to the key tunnel. The key tunnel can isolate the keys and is not dependent on the security of the MCU, such that the encryption approach can be supported even for an untrusted MCU. A key tunnel can offer other benefits as well, as there may be different ways to initialize shared secrets, and a key tunnel can provide built-in protection and detection against a variety of attacks. A key tunnel can also provide a mechanism to deliver secret keys or entropy to the MCU, as in some cases the MCU may need one or more secrets or entropy (e.g., random values) in addition to those sent to the crypto engine. A key tunnel can also provide a way to deliver authenticated commands to different hardware blocks, as well as a way to rotate wrapping keys and handover ownership, such as for RoT management. A key tunnel can also occupy only a small hardware area, which can be important for many devices where real estate is at a premium.

Figure 3A:
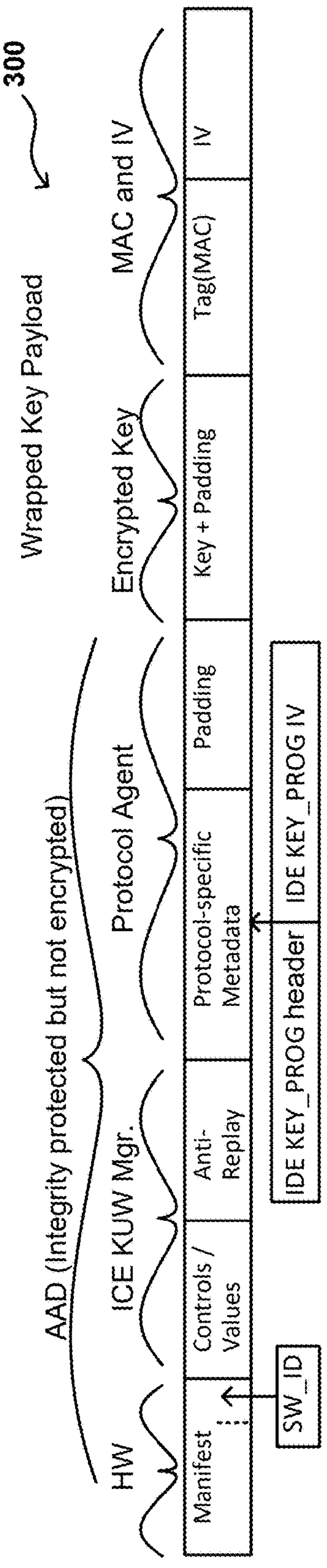
FIGS. 3A and 3B illustrate a format of a wrapped key and a key tunnel unit for processing such a wrapped key, in accordance with various embodiments.

FIG. 3A illustrates an example of a wrapped key payload 300 that can be generated in accordance with at least one embodiment. In this example, it can be seen that a portion of the payload is not encrypted but is integrity protected, as may include the manifest, controls, and metadata. An encrypted portion of the payload may include the wrapped key and any necessary padding, as well as any MAC or initialization vector (IV) data to be transmitted.

Figure 3B:
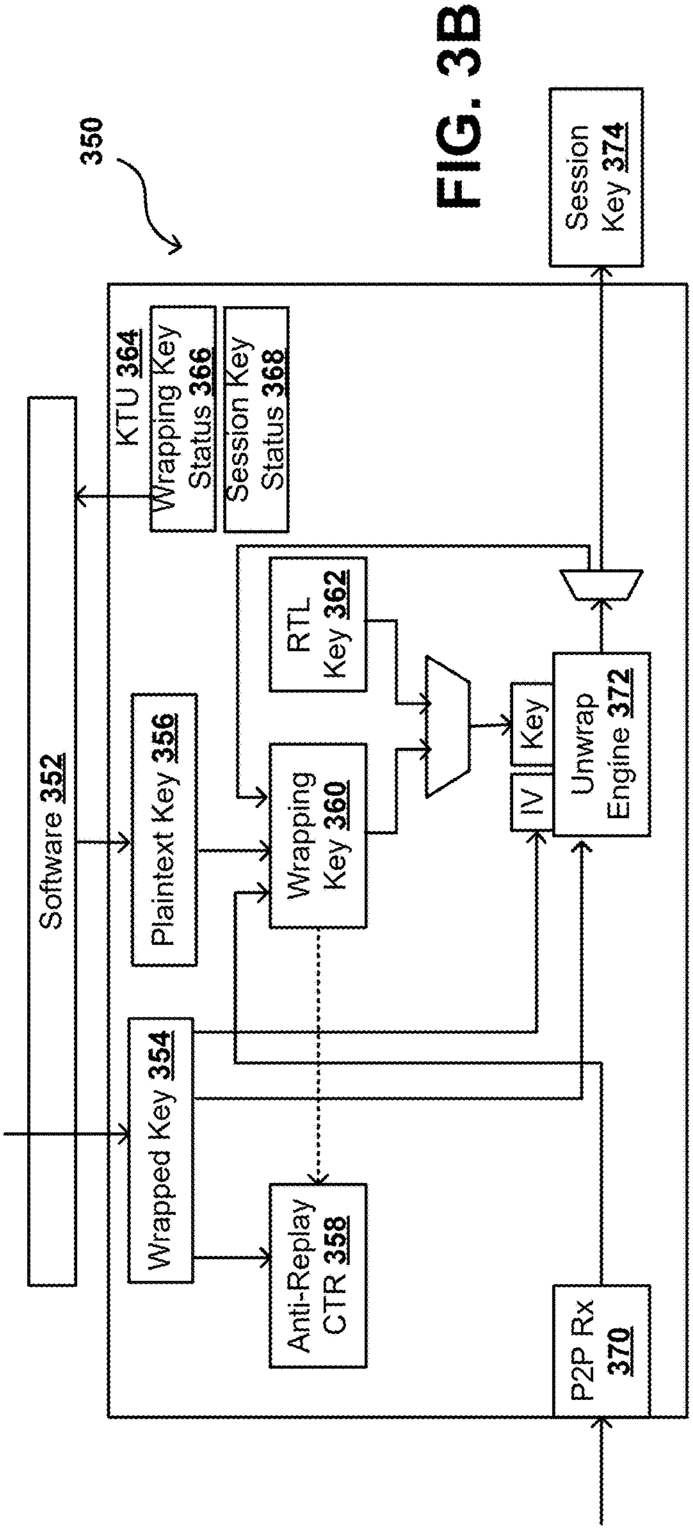

FIG. 3B illustrates an example key tunnel unit implementation 350 that can be utilized in accordance with various embodiments. A key tunnel unit (KTU) 364, which may include or provide an inline crypto engine, can support various secure operations, as may include inserting a plaintext wrapping key via serial interface or a register, as well as inserting a wrapped wrapping key with an RTL key or key from fuses. Such a block can also support the rotation of a wrapping key, as well as the insertion of a wrapped session key. The key tunnel unit can correspond to a piece of hardware at a data encryption endpoint, proximate the ICE, which in a least one embodiment can receive wrapped keys, unwrap or decrypt those keys, and then push those keys (such as unwrapped session keys 374) to the ICE or other encryption hardware. This unwrapping and providing of the session key in hardware can occur without exposing the unwrapped session key to software 352 on the respective computing device. In this example, a KTU 364 may receive a request for a session key 374 to a receive interface, such as a peer to peer (P2P) receive (Rx) interface 370, and then provide the appropriate session key 374 in response.

In at least one embodiment, a primary function of such a key tunnel unit (KTU) is to deliver session keys for use on corresponding sessions. There may be many such session keys, provided by large agents that manage keys for many different sessions. There might be a separate session for each destination, and for each destination there may be multiple virtual destinations or applications. A key unwrap engine 364 of the KTU can be responsible for unwrapping many wrapped keys 354 and providing them to the appropriate crypto engine associated with the appropriate session. As illustrated, the key tunnel unit 364 can receive many types of keys, as may include plaintext keys 356 from the software 352, as well as other keys such as RTL keys 362 and the like. The block 364 can maintain a status 366, 368 of the current wrapping key(s) and session key(s), and can use the appropriate current wrapping key 360 to unwrap a wrapped key 354 using an appropriate unwrap block 372 or operation to extract the session key. By receiving only wrapped session keys 354, the ability for an unintended party to obtain the session key from the transmission will be minimized. In at least one embodiment, a given KTU will only store the current wrapping key, unless there are multiple current wrapping keys to be stored to use to wrap different sets of session keys. When a wrapped key is received, that key passes through the unwrap engine 372, which is the engine that performs the unwrapping and verification of the tag or signature. After a key is unwrapped and verified, the determination is made as to whether that key is a session key 374 or a new wrapping key 360. If it is a session key 374, that key is transmitted to/through the ICE to the hardware that is integrated with the key tunnel. If the key is a new wrapping key 360, the key will go back and replace the current wrapping key.

Figure 4:
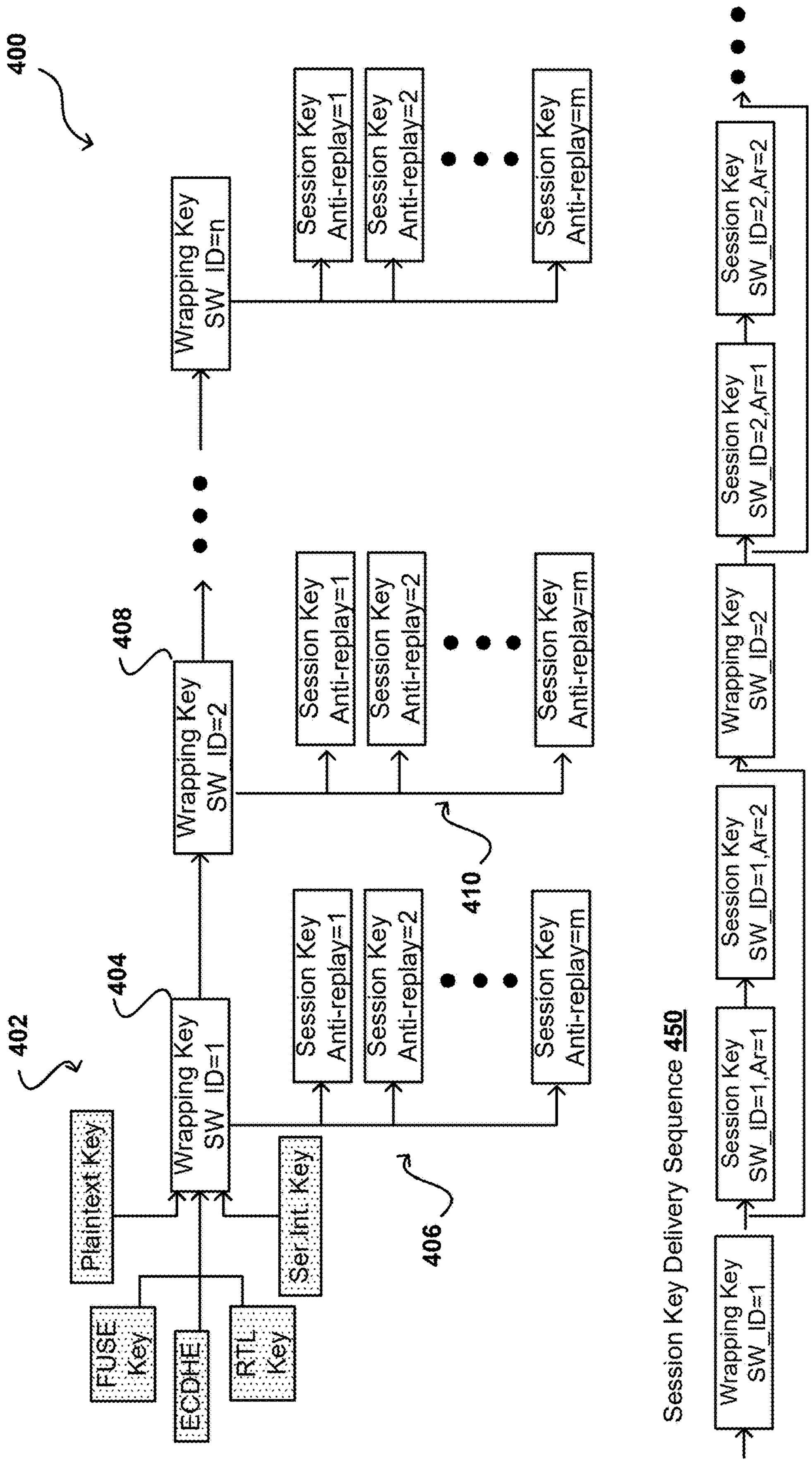
FIG. 4 illustrates an example flow of wrapping and session keys that can be produced in accordance with various embodiments.

In order to further minimize the likelihood of a session key being intercepted or otherwise obtained by an unintended party or recipient, there can be a number of additional steps taken to provide additional security. This may include rotation of the wrapping keys and session keys, for example, but can also include the transmission and usage of a sequence of keys for the purpose of making it difficult for an unintended party to receive and decrypt all relevant keys. FIG. 4 illustrates example flows 400, 450 of keys that can be provided in accordance with various embodiments. In this example, there can be an initial key 402 (the fundamental shared secret agreed upon per the protocol) sent that is unwrapped. This can be a plaintext key, for example, or other keys such as a FUSE key, Elliptic-curve Diffie-Hellman (ECDHE) key, register transfer level (RTL) key, or serial interface key, among other such options. This key can be sent over a public bus or interface to the ICE that can be stored as a current key associated with a session.

In this example, a first wrapping key can be sent (with an identifier such as SW_ID=1) that can be used to wrap one or more session keys 406 for one or more sessions. In order to reduce the likelihood of an unintended party obtaining the wrapping key 404, the wrapping key can be wrapped with the initial key 402, such as a received plaintext key. This wrapping would require an unintended party to intercept both the plaintext key and the wrapping key to be able to unwrap the wrapping key, then use that wrapping key to unwrap the session key. Further protection can be provided by, although now illustrated in FIG. 4, sending a series of wrapping keys that are each wrapped by the prior wrapping key. In this way, unless an unintended party is able to intercept or obtain all of these keys, the unintended party will not be able to unwrap the session key(s) that are wrapped with the final wrapping key in that sequence.

In the example illustrated in FIG. 4, once a wrapping key 404 is sent that is to be used to wrap session keys, and that wrapping key is unwrapped using any other prior wrapping key, that wrapping key 404 can be used to wrap one or more session keys 406. These may be session keys for sessions associated with the same or different recipients in various embodiments. The KTU (or other hardware) can unwrap these session keys using the current wrapping key, and can provide the unwrapped session keys to the ICE.

In at least one embodiment, it will be desirable to rotate or otherwise change the wrapping key used over time, such that if an unintended party obtains a wrapping key they will likely only be able to unwrap a limited number of session keys without also obtaining the subsequent new wrapping key, which will also be wrapped. The rotation or change can come at any appropriate time, such as after a specified length of time or a number of wrapped session keys, or upon manual instruction, among other such options. In this case, a new wrapping key 408 can be sent through the key tunnel that is wrapped using the prior wrapping key 404. Once unwrapped, the new wrapping key 408 can be used to wrap one or more subsequent session keys 410. In at least one embodiment, a sequence of wrapped wrapping keys may be sent for each rotation as well. The process can continue as illustrated, with new wrapping keys sent as part of a key rotation process to encrypt one or more session keys. As mentioned, there may be many different wrapping keys used at any given time, such that the wrapping key used for session keys of one user or party cannot be used to unwrap session keys for another user or party. As illustrated in the example key delivery sequence 450, a sequence of wrapping keys can be received by the KTU, where each wrapping key can wrap session keys until a new wrapping key is received that is to be used to wrap one or more subsequent session keys. Each individual session key can be unique in this example, and session keys may either be required to each be unique and may be rotated after an amount of time or other such factor. In at least one embodiment, each key can have a flag (or other indicator) set to indicate whether that key is to be used as a session key or a wrapping key. A session key can also have associated metadata that indicates, for example, the appropriate session to which that key belongs, whether it replaces a prior session key for that session, or other such information. In at least some embodiments, this metadata will not be encrypted but can still be authenticated so that, for example, intermediate controllers can view but not change the metadata. In at least one embodiment, the software can control how often new wrapping keys are generated and used, using an exposed hardware option.

Figure 5:
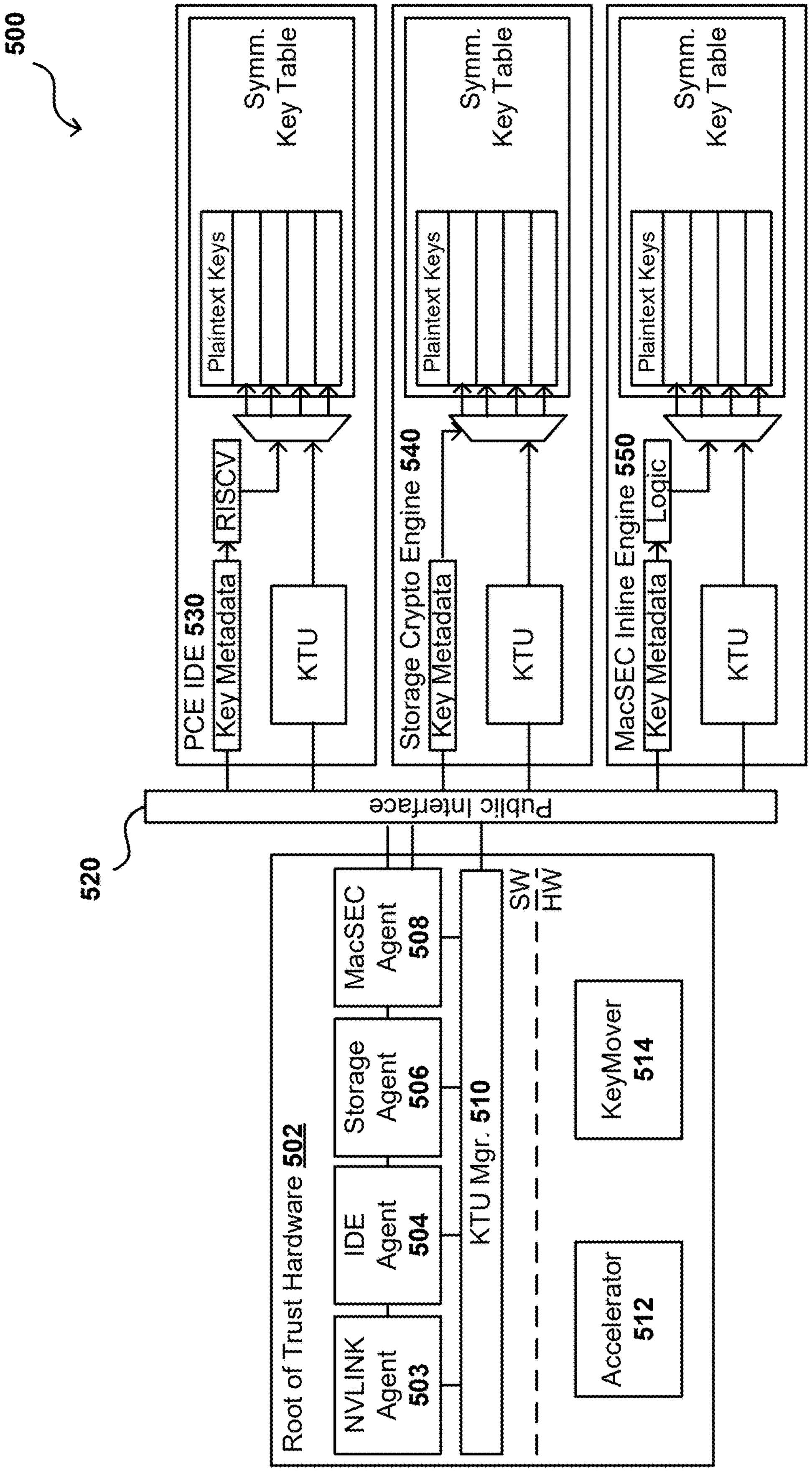
FIG. 5 illustrates components of an example system for transmitting wrapped session keys over a public interface, in accordance with at least one embodiment.

FIG. 5 illustrates an example system 500 that can be used to store session keys in at least one embodiment. As illustrated, the root of trust hardware 502 (e.g., a secure processor on chip) may operate or host several agents 503, 504, 506, 508 as discussed previously, which may be tasked with managing keys for various sessions, in cooperation with an KTU manager 510 on the software side, as well as other components (e.g., a crypto accelerator 512 and Key Mover component 514) on the hardware side. The keys (wrapped or otherwise), key metadata, and other relevant data can be transmitted over at least one public interface 520 or bus (or at least partially unsecure interface or bus) to be received to the respective recipients, which in this case can include a PCI Express-Integrity and Data Encryption (PCIe-IDE) component 530, a storage crypto engine 540, and a MacSEC inline engine 550, among other such options (e.g., other crypto hardware). In this example the session keys (stored in plaintext form in the key tables) are stored in respective symmetric key tables, using the keys unwrapped by the components (e.g., 364 in FIG. 3B) and the associated authenticated key metadata. In this example, each KTU block or component would store the current respective wrapping key(s) to use to unwrap corresponding session keys. In this example, the agents create manage the session keys while the KTU manager 510 manages the wrapping keys within the root of trust 502. The KTU manager can also be responsible for rotating the wrapping keys and performing the wrapping in at least one embodiment, although in other embodiments the wrapping keys may be provided to the individual agents for the agents to wrap the session keys. Agents for other or alternative protocols can be used as well within the scope of various embodiments. For an example protocol option 530, a small microcontroller (RISCV) may perform some of the management, such as to read the metadata and use it for routing the key to the correct location in the key table. In the second case, the index is read directly by the hardware as a pure index, which can be used to control the routing of the key. For the MacSEC inline engine 550, there is some hardware logic that analyzes the metadata and not the pure index, such as to determine a session ID or key type flag. The logic can convert or translate this metadata using a local indexing mechanism. Other approaches to processing wrapped keys received over a public interface (e.g., an on-chip system bus) can be used as well within the scope of various embodiments.

In at least one embodiment there may be a handover mechanism and multiple roots of trust. A first root of trust might start the initialization to generate the first wrapping key or perform the first key rotation. The actual session keys might, however, be handled by a different root of trust. The handover mechanism can be a secure hardware mechanism to handover ownership of the key tunnels between roots of trust by, for example, handing over the current wrapping key. The root of trust receiving the handover can function as the new or current root of trust that can send session keys. Upon taking ownership, that root of trust might first rotate the wrapping key to a new wrapping key, such that the prior root of trust does not know the shared secret and cannot do anything until it again obtains ownership. Such functionality can be important, as there may be different roots of trust for the system at different times, such as during boot versus at runtime. Further, such an approach can be important for operations involving confidential compute, for example, where only the current root of trust is to be able to access certain information. The current wrapping key can thus be passed between secure processors, which can take over as the current root of trust. Such an approach can be used to encrypt any or all communications going in and out of a chip, including DRAM, PCIe, Video, ethernet, and proprietary busses like NVLINK and Chip2Chip, among other such options.

Figure 6:
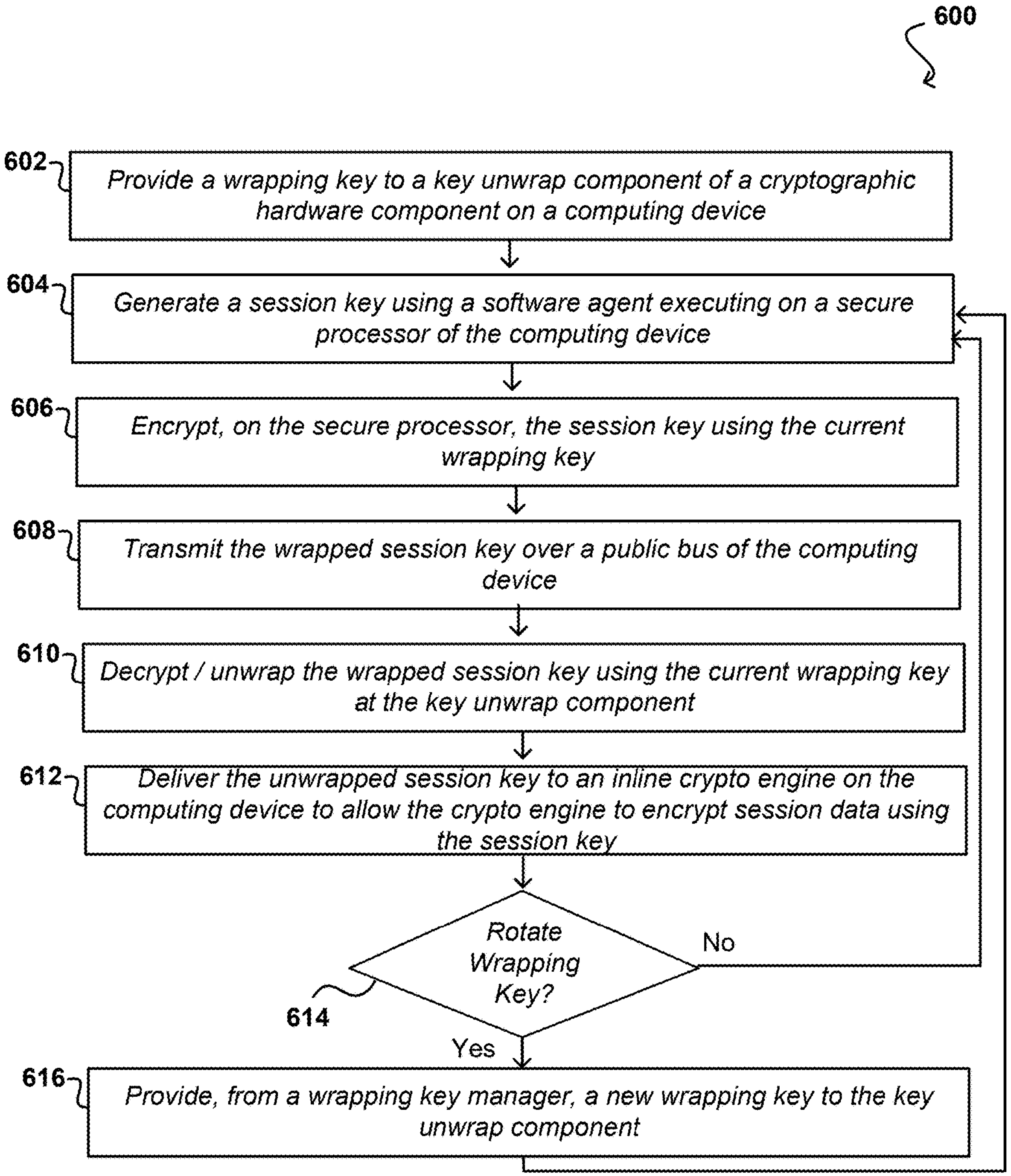
FIG. 6 illustrates an example process for transmitting wrapped session keys over an interface that can be performed in accordance with at least one embodiment.

FIG. 6 illustrates an example process 600 for securely transmitting session keys over a public interface that can be performed in accordance with various embodiments. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to session keys, various other types of data may be secured advantageously for similar or other purposes as well within the scope of the various embodiments. In this example, a wrapping key is provided 602 to a key tunnel unit (KTU) component of cryptographic hardware on a computing device. As discussed previously herein, this may include one of a sequence of wrapping keys that were also each encrypted with a prior wrapping key or other shared secret, among other such options. A session key can then be generated 604 using a software agent executing on a secure processor (or otherwise within a root of trust) on the computing device. There may be several agents each managing session keys for different sessions in at least one embodiment. The session key can then be encrypted 606, or "wrapped," on the secure processor using the current wrapping key. The wrapped session key can then be transmitted 608 over a public bus (or other at least partially unsecure interface) of the computing device.

In this example, the wrapped session key can be received to the key tunnel unit of the crypto hardware. The wrapped session key can be decrypted 610 or "unwrapped" using the current wrapping key stored by the key tunnel unit. The unwrapped session key can then be delivered 612 to an inline crypto engine, for example, on the computing device to allow the crypto engine to encrypt corresponding session data using the unwrapped (e.g., plaintext) session key. A determination can be made 614 as to whether the wrapping key should be rotated or otherwise changed to a new wrapping key. If not, the process can continue with the next session key being wrapped using the current wrapping key. If the wrapping key is to be rotated, then a new wrapping key can be provided 616 from a wrapping key manager to the key tunnel unit to be used as the current wrapping key. The key tunnel unit can analyze a flag or value for the key to determine that the key is to be treated as a new wrapping key and not another session key. The process can then continue using the "new" current wrapping key. In other embodiments, a new wrapping key may not be generated until after a new session key is generated or received, and that new session key is to be transmitted using a new wrapping key, where by the new wrapping key will be transmitted first, then used to wrap the new session key to be transmitted. Various other orderings or approaches can be used as well within the scope of the various embodiments.

In at least one embodiment, data to be transferred using these data connections between peer devices can be received from, or transmitted to, any number of a variety of computing systems, devices, and services, and this functionality can be implemented in various types of systems or networked environments. For example, transmitting client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options, which may include a variety of interconnected network devices. In one example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources. Such a system can also be used to generate or present virtual reality (VR), augmented reality (AR), or enhanced reality (ER) content. In other embodiments, such a system can be used to perform hardware testing using simulation, to generate synthetic data, or as part of a collaborative content creation platform for 3D assets, among other such options.

In at least some situations, it may be desired and/or beneficial to further enhance security by moving away from the use of a fixed key, or single key to be used over an extended period of time, for performing various cryptographic operations. This may include, for example, having the ability to securely rotate or provide new keys for at least some of these operations. These keys can include a sequence of unique ephemeral keys (or key sets) that are generated for specific sessions, transactions, or periods of time, after which those keys are discarded and new ephemeral keys used. One primary benefit of the use of such ephemeral keys is that a given ephemeral key will only be used for a relatively short period of time, such that if a given key is compromised that key may have little to no ability to be used to gain access to sensitive or otherwise protected information. In at least one embodiment, a pairing key—such as a per-package pairing key (P3K)—can be generated as discussed previously, which can be available to both a root-of-trust (RoT) and a key tunnel unit (KTU) as discussed previously. Instead of using this key over time for a number of cryptographic operations, however, this key can be used to generate a sequence of temporary or ephemeral keys that can each be used for only a relatively short period of time, to perform operation such as to generate inline crypto engine (ICE) keys.

Figure 7:
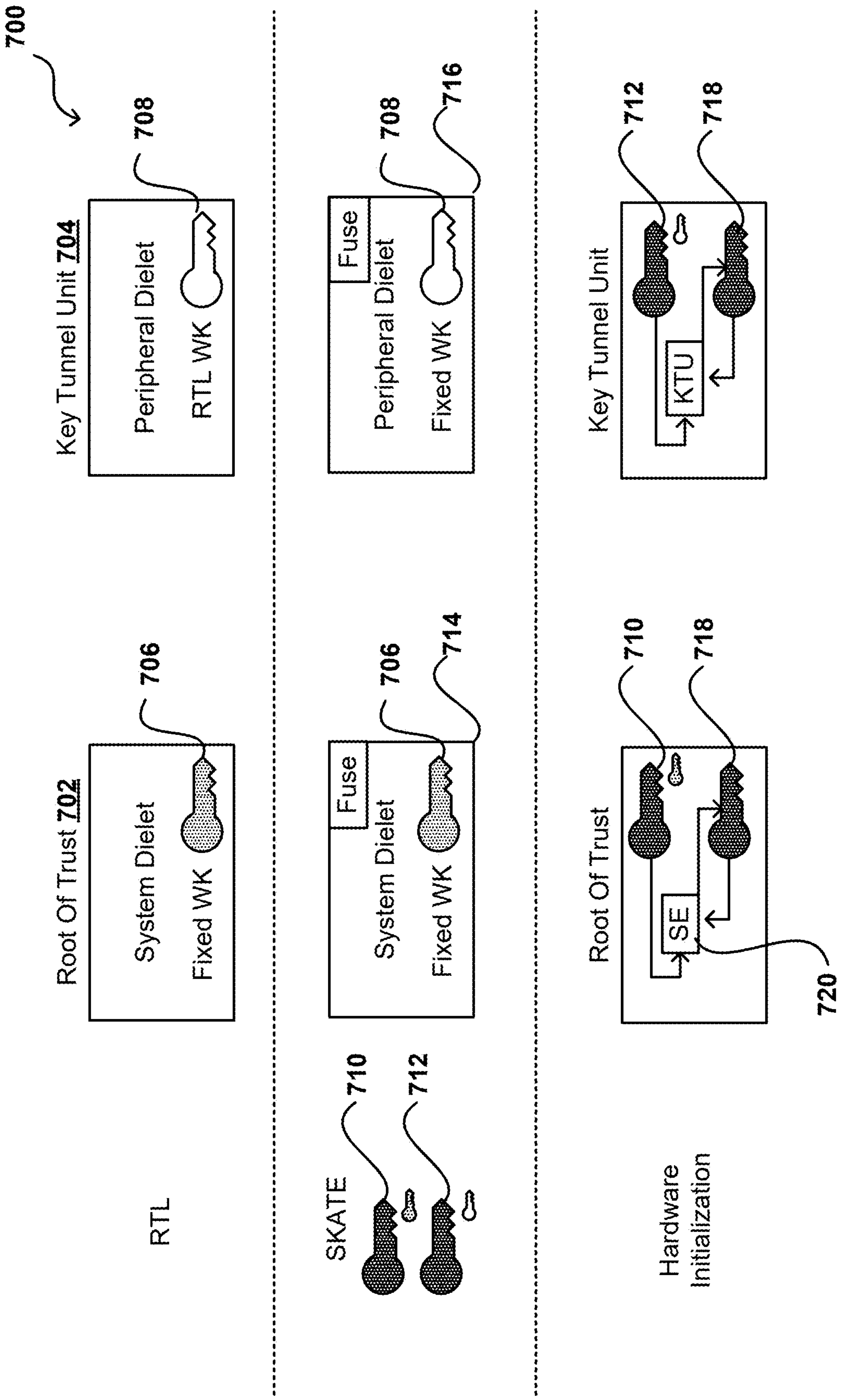
FIG. 7 illustrates an initial set of stages for the generation of a set of ephemeral cryptographic keys, in accordance with at least one embodiment.

FIG. 7 illustrates an example sequence 700 that can be performed using at least the illustrated components to cause both an RoT 702 and a KTU 704 to have a copy of a per-package wrapping key (P3K) in accordance with at least one embodiment. In this example, at the RTL level, there can be a fixed wrapping key 706 held by the RoT 702, as may be referred to as a RoT key wrapping key. There can also be a RTL wrapping key 708 stored by the KTU 704, which can also be referred to as a dielet key wrapping RTL key. In this example, each dielet class of the silicon can have a unique RTL key. Provisioning of fuses can be performed in a next stage, where a wrapped per-package pairing key (P3K) can be provisioned to both a system dielet 714 and a peripheral dielet 716 in this example. P3Ks may be provisioned for other dielets or recipients as well in accordance with various embodiments. This can include, for example, a first P3K 710 that is wrapped with the respective RTL key for the system dielet 714, here the fixed wrapping key 706, and a second P3K 712 that is wrapped with the respective RTL key for the peripheral dielet 716, here the RTL wrapping key 708. In a hardware initialization stage, each wrapped P3K 710, 712 can be unwrapped in the respective dielet using the respective RTL key. In the RoT, the unwrapping may be performed by a secure engine (SE) 720 or cryptographic engine, for example. This can result in both the system dielet 714 (or RoT 702) and the peripheral dielet (or KTU 704) having an unwrapped version of the P3K 718. The unwrapped P3K 718 can then be used by both the RoT and the KTU to generate a set of ephemeral keys. In at least one embodiment, a P3K 718 can be generated for each package or chip, and each chip can contain multiple dielets 714, 716 that can each potentially receive a copy of the P3K 718. Each KTU on a chip would typically receive the P3K so they will all come out of a reset (or similar action) with a comment key (per package).

Figure 8:
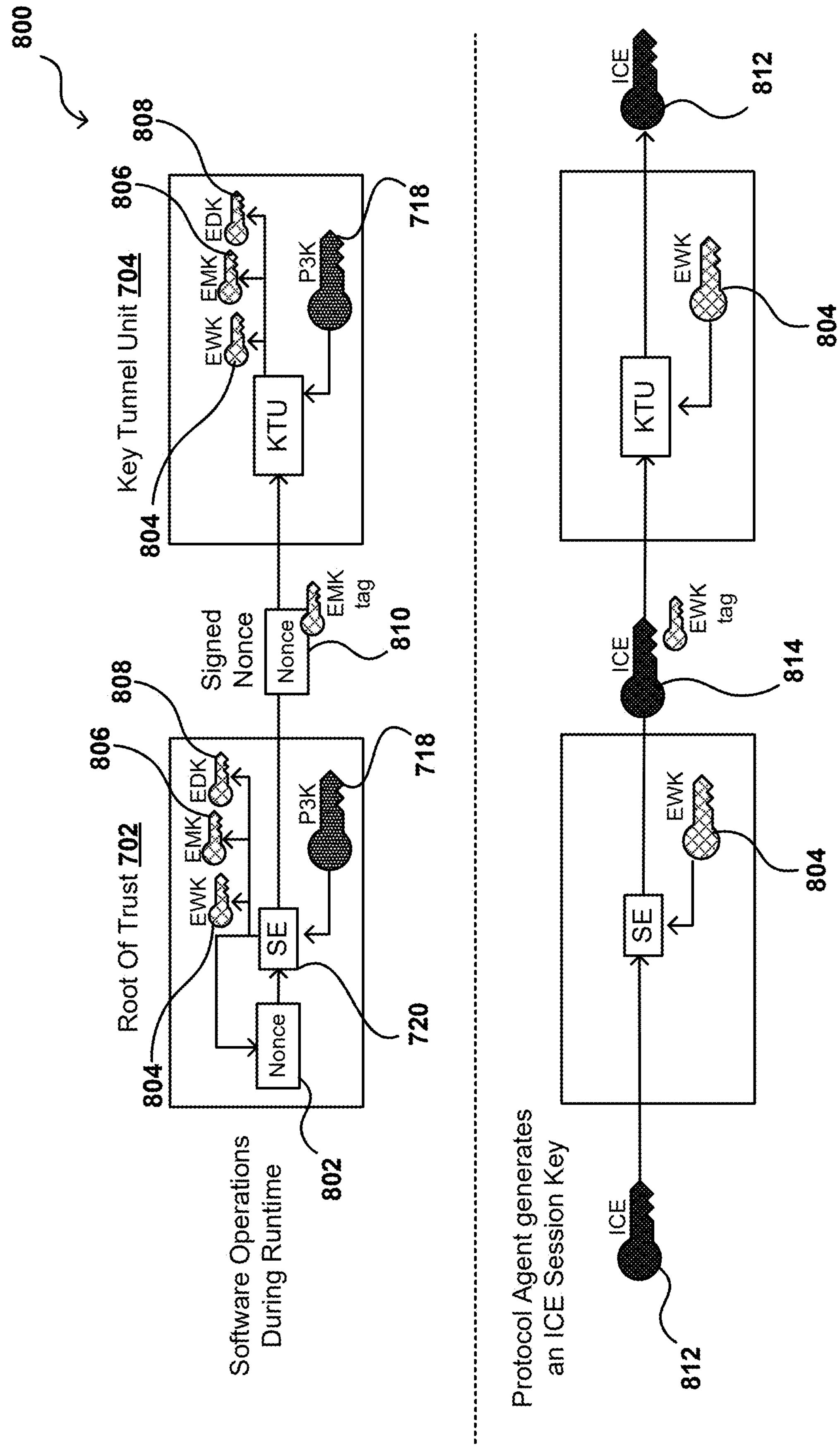
FIG. 8 illustrates a subsequent set of stages for the generation of a set of ephemeral cryptographic keys, in accordance with at least one embodiment.

FIG. 8 illustrates an example sequence 800 that can be performed using at least the illustrated components to generate and use a set of ephemeral keys for various encryption operations. These stages can be performed over multiple instances in order to rotate keys and/or generate new ephemeral keys, typically using one or more software operations at runtime. The ephemeral keys should be generated so that they are unique and never repeat, as well as generating no history information that can be used to try to take advantage of a compromised key to derive a current or future key. In this example, both the RoT 702 and each KTU 704 can have the unwrapped or plaintext wrapping key P3K 718 after reset or power up. As mentioned, this P3K 718 is unique to a given chip or package, and will be shared amongst the KTUs on that chip. An advantage of such an approach is that the KTUs can each start with a shared secret without a need to send that initial shared secret in plain text, as in other initialization processes.

This shared P3K 718 can then be used to generate the same ephemeral keys 804, 806, 808 in both the RoT 702 and a KTU 704 without a need to transmit or expose the generated ephemeral keys. In this example, a nonce 802 can be generated in the RoT 702 that can be used with the P3K 718 to produce the ephemeral keys using a secure engine 720. The nonce can be a random number in at least one embodiment, or can be another unique string or seed that can be used with the P3K 718 to generate ephemeral keys. In order to provide for enhanced security, the nonce can be quite long—such as may be on the order of the size of the key itself (e.g., around 256 bits in length). A longer nonce will be harder to predict in many instances. In this example the P3K 718 and the nonce 802 can be used to, through cryptographic derivation, generate a set of ephemeral keys. This set can include, for example, an ephemeral wrapping key (EWK) 804, an ephemeral message key (EMK 806), and an ephemeral derivation key (EDK) 808, among other such options. These three ephemeral keys can be used to perform operations that were previously performed by a single key, and can also be rotated over time to provide enhanced security.

In order to allow the KTU 704 to generate the same set of ephemeral keys, the RoT can send the nonce 802 to the KTU 704. The nonce can be sent as part of a signed message to secure the transmission of the nonce 802 between the RoT 702 and the KTU 704. In an initial transmission, including the first nonce to be used to generate the first set of ephemeral keys, the nonce may not be signed, but can instead be transmitted without signature. In some embodiments, the initial transmission may be signed and/or encrypted with the P3K 718. The unique nonce and the P3K 718 can then be used by the KTU 704 to generate the same set of ephemeral keys, using a secure engine of the KTU. These ephemeral keys 804, 806, 808 can then be used by the KTU 704 to perform various cryptographic operations, such as to wrap individual session keys for transmission.

After a period of time, a new set of ephemeral keys may be generated. To generate these new keys at runtime, the RoT 702 can generate a new nonce 802 to be used with the current ephemeral derivation key 808 to generate a new set of ephemeral keys. This new nonce 802 can again be transmitted to the KTU 704 in order to allow the KTU 704 to independently generate the new ephemeral keys. The nonce can be signed with the newly-generated ephemeral message key (EMK) 806. Once the new set of ephemeral keys is generated by the KTU 704 using the nonce and the current EDK, the prior set of ephemeral keys can be discarded by the KTU 704 if certain conditions are met. In at least one embodiment, the newly-derived ephemeral keys can only replace the prior ephemeral keys if the signature on the transmitted message is verified correctly. Such an approach can protect the system against an adversary, for example, who sends a nonce with a fake signature. If the fake nonce were to be accepted, the KTU would be lost and can only be restored with a reset (or other such operation). Since all the ephemeral keys are unique, the keys once discarded will not be able to be used for any unintended purposes if compromised.

An advantage of using the ephemeral message key 806 to sign the nonce is that security is enhanced relative to using a fixed key to sign the nonce. As mentioned, the ephemeral message key is only valid for a short period of time, so a message key being compromised can result in only minimal security risk while that key is still valid. Because a different ephemeral key is being used to sign each transmitted nonce, however, once the key is used to sign a nonce that key should never again be used to sign a nonce (except potentially in the case of a failed rotation), so even a compromised EMK should not allow a fake nonce to be signed and processed to generate a new set of keys. A malicious user could also not send the same signed nonce a second time, because after the first transmission a new EMK would be generated such that this prior signed nonce would no longer be accepted as having a valid signature. Once a signature is verified on a nonce, the new ephemeral keys can be generated and can become valid or official for use in subsequent cryptographic operations.

In this example, there are multiple ephemeral keys generated that can be used for different types of operations, which can help to further increase security in the case that one of these keys is compromised. One such ephemeral key is an ephemeral wrapping key (EWK) 804. This EWK 804 can be used similar to how a wrapping key was used in the process of FIG. 6, or the systems of FIGS. 2-5, to perform cryptographic operations such as to encrypt an ICE key 812 in the SE of the RoT 702, transmit the encrypted and signed ICE key 814 to the KTU 704, an then decrypt or unwrap the ICE key 812 using the current EWK 804. The KTU 704 can then use the unwrapped ICE key 812 to perform cryptographic operations. As mentioned an ephemeral message key (EMK) 806 can be generated for use in signing the nonce that is to be transmitted (in a "message") from the RoT 702 to the KTU 704. Such an EMK 806 can be used to sign other messages as well, while valid.

A third ephemeral key is an ephemeral derivation key (EDK) 808. An EDK 808 can be used to derive the next set of ephemeral keys. As mentioned, a first set of ephemeral keys can be generated using the received nonce 810 and the respective per-package wrapping key (P3K) 718. In order to further secure subsequent sets of ephemeral keys, however, those new sets can be derived from the new nonce 810 and the current EDK 808. This provides enhanced security not only because the EDK 808 is never transmitted outside the RoT 702 or KTU 704 in most instances, but also because a given EDK is only valid for a relatively short period of time, and thus can only be used to derive new keys for the period of time in which it is valid, and will no longer be able to be used for such purposes once discarded for a new EDK. Because the EDK is only used to derive a new set of ephemeral keys, and then becomes almost instantly invalid, it will also be very difficult to obtain an instance of the key through improper mechanisms, such as by analyzing emitted electromagnetic waves, because the EDK is not used at any other time than to generate a new set of ephemeral keys, at which point it is no longer a valid EDK. Because the EDK is not otherwise used, an antenna or other device placed near the KTU will be unable to intercept and analyze a signal that contains the EDK, and thus will be unable to infer the EDK.

In at least one embodiment, each message transmitted between an RoT 702 and a KTU 704 can also have a count inserted as metadata (or otherwise attached to the message). A monotonically increasing counter (also referred to as an anti-reply counter (ARC)) can be used by the RoT 702 and KTU 704 (and KTU manager, as appropriate), with each ARC having the same value and incrementing for each transmitted message. Such an approach prevents a user or entity from attempting to replay or resubmit a message, where a key used with that message may still otherwise be valid. A KTU 704 can then only accept a signed message that has the next highest count value relative to a previous message. In at least one embodiment, the count for a sequence of messages cannot involve a skip or replay of a count, or accepting of count values out of order. Any message received without the appropriate count value can be rejected by the KTU 704. If a message is rejected then all subsequent messages with higher count values will be rejected as well. Such an approach can help to prevent various attacks, such as where a malicious entity may attempt to use old keys, restart a counter while keeping the same key by repeating packets, or switching between key delivery and status messages, among other such approaches. In at least one embodiment, a KTU can issue a "get status" or similar command after every key delivery to verify that a message was not dropped or failed, and can also issue such a command before key rotation to detect dropped messages before the counter is reset. A counter may be reset each time an ephemeral key rotation is performed in order to avoid the counter reaching or exceeding a limit, or otherwise becoming unnecessarily large and consuming unnecessary resources. A rollover counter can be used in some embodiments that will automatically start the count over when reaching a specified value.

As mentioned above, operations such as handoff and sharing of a current key can be performed as well. In prior approaches, a wrapping key such as a P3K would be sent for such purposes. An ephemeral key can instead be used for such purposes, as may include sending an ephemeral derivation key (EDK). The new owner can perform a key rotation with the new nonce, and can be the new owner of the KTU, with the prior owner not having a copy of the new set of ephemeral keys. If there are multiple KTUs, the signed nonce message can be sent through a broadcast or other such approach, such that the KTUs should receive the new signed nonce at approximately the same time, so all KTUs will be able to derive and maintain a current set of ephemeral keys. The count of this broadcast message will also allow each KTU to maintain a current value of an ARC counter. As mentioned, fewer or additional ephemeral keys can be derived and used for any of these or other such purposes as well within the scope of various embodiments.

Figure 9A:
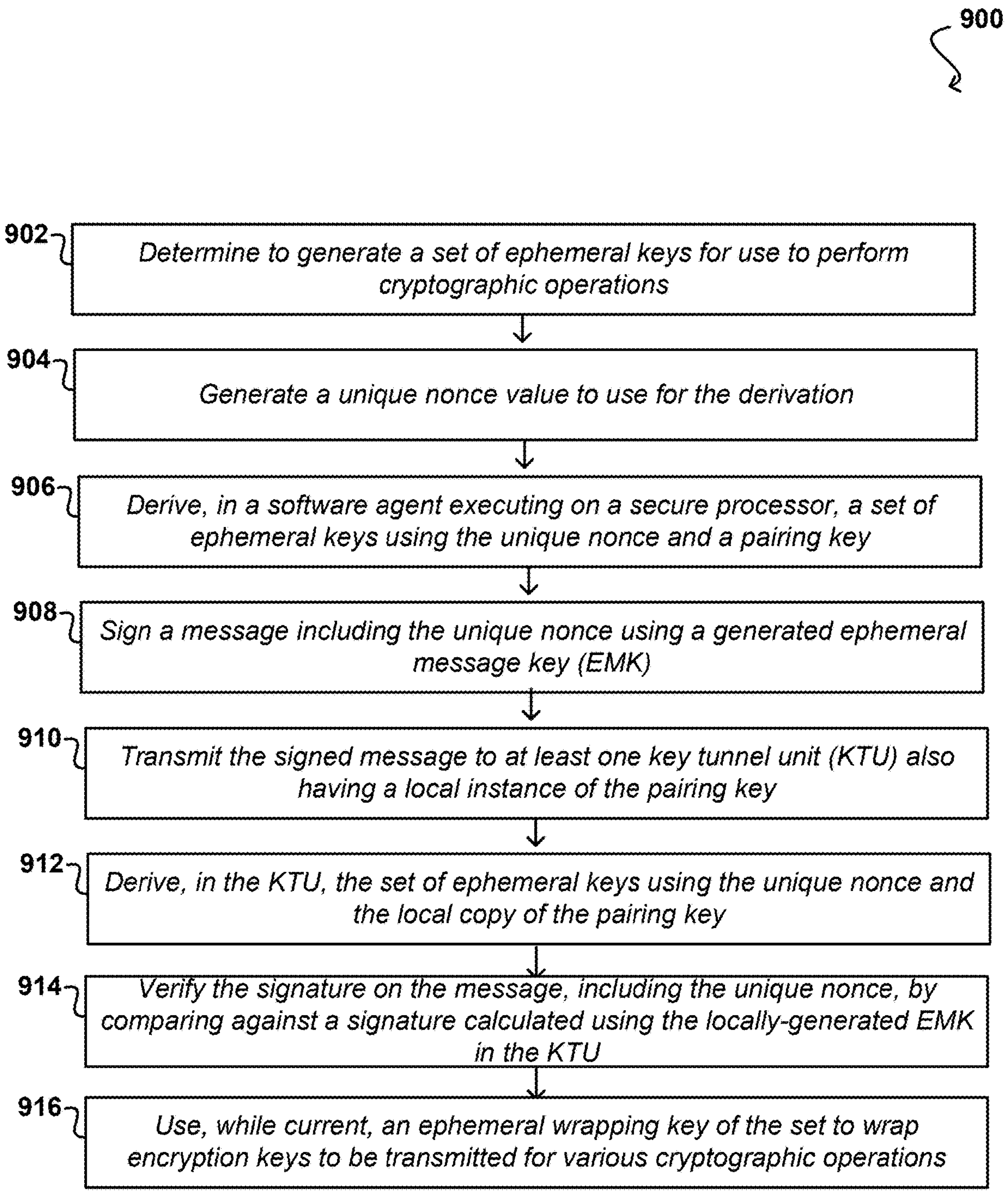
FIG. 9A illustrates an example process that can be performed to generate an initial set of ephemeral keys, in accordance with at least one embodiment.
Figure 9B:
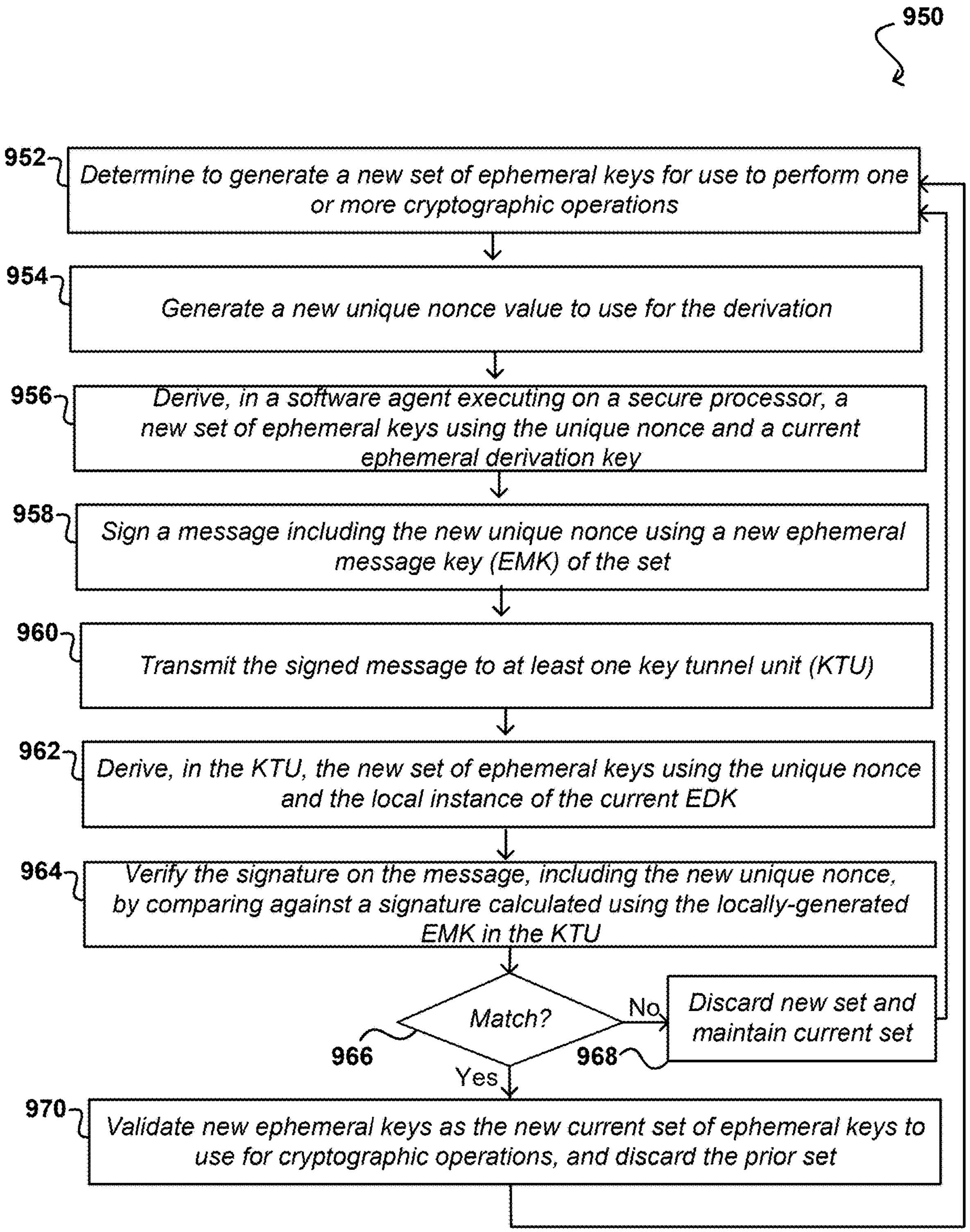
FIG. 9B illustrates an example process that can be performed to generate subsequent sets of ephemeral keys to use for cryptographic operations, in accordance with at least one embodiment.

FIGS. 9A and 9B illustrate example processes that can be performed to derive a set of ephemeral keys according to at least one embodiment. The example process 900 of FIG. 9A illustrates derivation of an initial set of ephemeral keys, while the example process 950 of FIG. 9B illustrates derivation of subsequent sets of ephemeral keys. In the example process 900 of FIG. 9A, it is determined 902 to generate a set of ephemeral keys to use to perform one or more cryptographic operations. A component such as a software agent, executing on a secure processor in a computing device, can generate 904 a unique nonce value (e.g., a random integer or character string of determined length) to use for the derivation. The software agent can derive 906 the set of ephemeral keys using the unique nonce and a pairing key, such as a per-package pairing key unique for a given chip or package. The set can include one or more ephemeral keys, such as an ephemeral message key, and ephemeral wrapping key, and an ephemeral derivation key, among other such options. A message can be generated that includes the unique nonce, and this message can be signed 908 using the generated ephemeral message key (EMK) of the set. The signed message can be transmitted 910 to at least one key tunnel unit (KTU) (or other secure and/or trusted recipient) that also has a local instance of the pairing key. Another instance of the set of ephemeral keys can be derived 912 in the KTU using the received unique nonce and the local instance of the pairing key. The signature generated using the EMK in the RoT can be verified 914 using the EMK that was separately generated in the KTU, such as to determine that the signatures match, or have the same value. If the signature on the message cannot be verified, then the derivation process will need to restart and the ephemeral keys can be discarded. While this set is current and/or valid, the ephemeral wrapping key of the set can be used 916 to wrap one or more encryption keys, for example, that can be used to perform one or more cryptographic operations external to the KTU.

A process 900 such as that illustrated in FIG. 9A can thus be used to generate an initial set of ephemeral keys to use for cryptographic operations. As mentioned, however, it can be desirable or beneficial to rotate these keys, such as by periodically (or at other appropriate times or intervals) generating a new set of ephemeral keys and discarding the current (or prior) set of ephemeral keys. FIG. 9B illustrates an example process 950 that can be used to generate a new set of ephemeral keys to use to perform cryptographic operations, according to at least one embodiment. In this example process, the generation will not be based on the same pairing key as the original set, but can be based on, for example, one of the current ephemeral keys. In this example process 950, it is determined 952 to generate a new set of ephemeral keys to use to perform on or more cryptographic operations. Accordingly, a new unique nonce can be generated 954 to use for the derivation, as may involve generating a random number of determined length using a random number generator of a software agent executing on a secure processor. A new set of ephemeral keys can be derived 956 in the software agent using the new unique nonce and a current ephemeral derivation key (EDK), which was contained in the previously-generated set. A message can be generated that contains the new unique nonce, and this message can be signed 958 using the new ephemeral message key (EMK) of the set. The signed message can then be transmitted 960 to at least one key tunnel unit (KTU) also having a local instance of the current EDK. A new set of ephemeral keys can be derived 962 in the KTU using the nonce and the current EDK. The signature generated using the EMK in the RoT can be verified 964 using the EMK that was separately generated in the KTU, such as to determine whether those signatures match, or have the same value. If the signatures are determined 966 not to match, or the signature on the message is otherwise not correctly verified, then the new set of ephemeral keys can be discarded 968 and the current set maintained. Another action may be taken as well, such as to raise an alarm or log a suspicious update attempt, among other such actions. If the signature is verified, or the separately generated signatures are determined 966 to match, then the new set of ephemeral keys can be validated 970 for use for performing subsequent cryptographic operations, and the prior set can be discarded and unavailable for use in performing additional cryptographic operations.

Data Center

Figure 10:
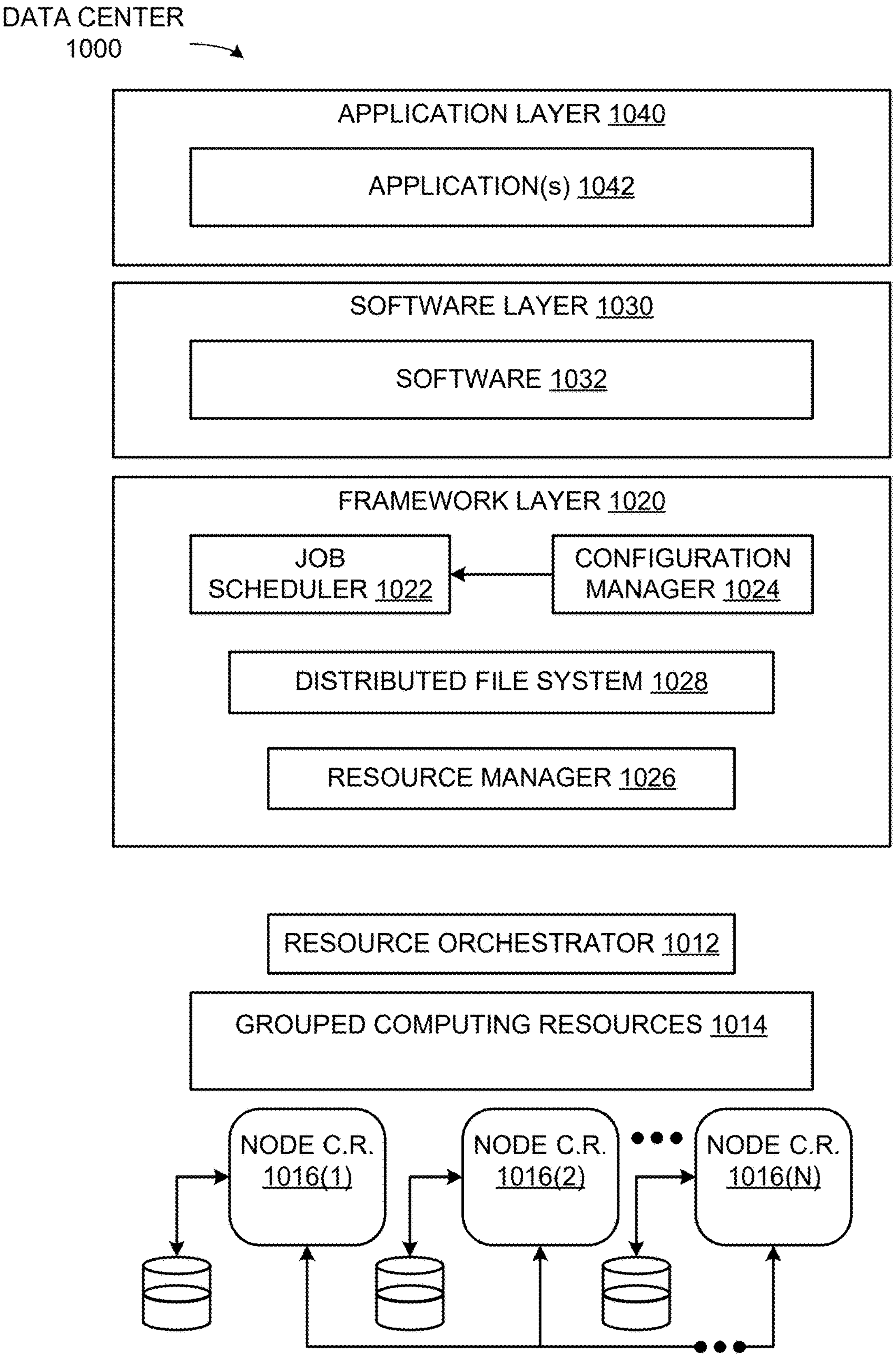
FIG. 10 illustrates an example data center system, according to at least one embodiment.

FIG. 10 illustrates an example data center 1000, in which at least one embodiment may be used. In at least one embodiment, data center 1000 includes a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents a positive integer (which may be a different integer "N" than used in other figures). In at least one embodiment, node C.R.s 1016(1)-1016(N) may include, but are not limited to, any number of central processing units ("CPUs") or other processors (including accelerators, field programmable gate arrays (FPGAs), graphics processors, etc.), memory storage devices 1018(1)-1018(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). In at least one embodiment, separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1012 may configure or otherwise control one or more node C.R.s 1016(1)-1016(N) and/or grouped computing resources 1014. In at least one embodiment, resource orchestrator 1012 may include a software design infrastructure ("SDI") management entity for data center 1000. In at least one embodiment, resource orchestrator 1012 may include hardware, software or some combination thereof.

In at least one embodiment, as shown in FIG. 10, framework layer 1020 includes a job scheduler 1022, a configuration manager 1024, a resource manager 1026 and a distributed file system 1028. In at least one embodiment, framework layer 1020 may include a framework to support software 1032 of software layer 1030 and/or one or more application(s) 1042 of application layer 1040. In at least one embodiment, software 1032 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1028 for large-scale data processing (e.g., "big data"). In at least one embodiment, job scheduler 1022 may include a Spark driver to facilitate scheduling of workloads supported by various layers of data center 1000. In at least one embodiment, configuration manager 1024 may be capable of configuring different layers such as software layer 1030 and framework layer 1020 including Spark and distributed file system 1028 for supporting large-scale data processing. In at least one embodiment, resource manager 1026 may be capable of managing clustered or grouped computing resources mapped to or allocated for support of distributed file system 1028 and job scheduler 1022. In at least one embodiment, clustered or grouped computing resources may include grouped computing resources 1014 at data center infrastructure layer 1010. In at least one embodiment, resource manager 1026 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1028 of framework layer 1020. In at least one embodiment, one or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1028 of framework layer 1020. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1024, resource manager 1026, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

In at least one embodiment, data center 1000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1000. In at least one embodiment, trained machine learning models corresponding to one or more neural networks may be used to infer or predict information using resources described above with respect to data center 1000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Embodiments presented herein can allow for a sequence of ephemeral key sets to be generated to be used to perform various cryptographic operations.

Computer Systems

Figure 11:
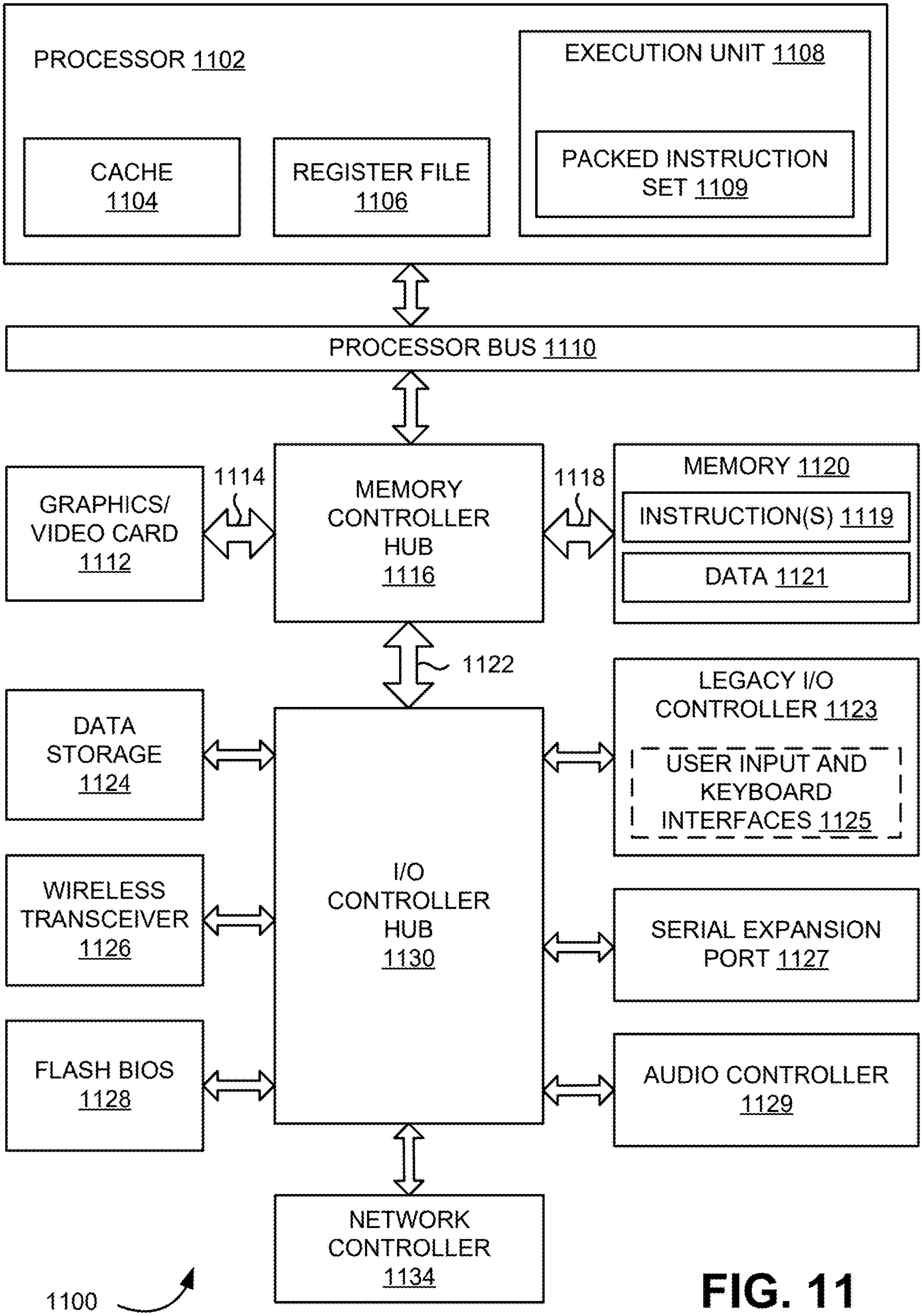
FIG. 11 is a block diagram illustrating a computer system, according to at least one embodiment.

FIG. 11 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1100 may include, without limitation, a component, such as a processor 1102 to employ execution units including logic to perform algorithms for process data, in accordance with present disclosure, such as in embodiment described herein. In at least one embodiment, computer system 1100 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1100 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1100 may include, without limitation, processor 1102 that may include, without limitation, one or more execution units 1108 to perform machine learning model training and/or inferencing according to techniques described herein. In at least one embodiment, computer system 1100 is a single processor desktop or server system, but in another embodiment, computer system 1100 may be a multiprocessor system. In at least one embodiment, processor 1102 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1102 may be coupled to a processor bus 1110 that may transmit data signals between processor 1102 and other components in computer system 1100.

In at least one embodiment, processor 1102 may include, without limitation, a Level 1 ("L1") internal cache memory ("cache") 1104. In at least one embodiment, processor 1102 may have a single internal cache or multiple levels of internal cache. In at least one embodiment, cache memory may reside external to processor 1102. Other embodiments may also include a combination of both internal and external caches depending on particular implementation and needs. In at least one embodiment, a register file 1106 may store different types of data in various registers including, without limitation, integer registers, floating point registers, status registers, and an instruction pointer register.

In at least one embodiment, execution unit 1108, including, without limitation, logic to perform integer and floating point operations, also resides in processor 1102. In at least one embodiment, processor 1102 may also include a microcode ("ucode") read only memory ("ROM") that stores microcode for certain macro instructions. In at least one embodiment, execution unit 1108 may include logic to handle a packed instruction set 1109. In at least one embodiment, by including packed instruction set 1109 in an instruction set of a general-purpose processor, along with associated circuitry to execute instructions, operations used by many multimedia applications may be performed using packed data in processor 1102. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1108 may also be used in microcontrollers, embedded processors, graphics devices, DSPs, and other types of logic circuits. In at least one embodiment, computer system 1100 may include, without limitation, a memory 1120. In at least one embodiment, memory 1120 may be a Dynamic Random Access Memory ("DRAM") device, a Static Random Access Memory ("SRAM") device, a flash memory device, or another memory device. In at least one embodiment, memory 1120 may store instruction(s) 1119 and/or data 1121 represented by data signals that may be executed by processor 1102.

In at least one embodiment, a system logic chip may be coupled to processor bus 1110 and memory 1120. In at least one embodiment, a system logic chip may include, without limitation, a memory controller hub ("MCH") 1116, and processor 1102 may communicate with MCH 1116 via processor bus 1110. In at least one embodiment, MCH 1116 may provide a high bandwidth memory path 1118 to memory 1120 for instruction and data storage and for storage of graphics commands, data and textures. In at least one embodiment, MCH 1116 may direct data signals between processor 1102, memory 1120, and other components in computer system 1100 and to bridge data signals between processor bus 1110, memory 1120, and a system I/O interface 1122. In at least one embodiment, a system logic chip may provide a graphics port for coupling to a graphics controller. In at least one embodiment, MCH 1116 may be coupled to memory 1120 through high bandwidth memory path 1118 and a graphics/video card 1112 may be coupled to MCH 1116 through an Accelerated Graphics Port ("AGP") interconnect 1114.

In at least one embodiment, computer system 1100 may use system I/O interface 1122 as a proprietary hub interface bus to couple MCH 1116 to an I/O controller hub ("ICH") 1130. In at least one embodiment, ICH 1130 may provide direct connections to some I/O devices via a local I/O bus. In at least one embodiment, a local I/O bus may include, without limitation, a high-speed I/O bus for connecting peripherals to memory 1120, a chipset, and processor 1102. Examples may include, without limitation, an audio controller 1129, a firmware hub ("flash BIOS") 1128, a wireless transceiver 1126, a data storage 1124, a legacy I/O controller 1123 containing user input and keyboard interfaces 1125, a serial expansion port 1127, such as a Universal Serial Bus ("USB") port, and a network controller 1134. In at least one embodiment, data storage 1124 may comprise a hard disk drive, a floppy disk drive, a CD-ROM device, a flash memory device, or other mass storage device.

In at least one embodiment, FIG. 11 illustrates a system, which includes interconnected hardware devices or "chips", whereas in other embodiments, FIG. 11 may illustrate an exemplary SoC. In at least one embodiment, devices illustrated in FIG. 11 may be interconnected with proprietary interconnects, standardized interconnects (e.g., PCIe) or some combination thereof. In at least one embodiment, one or more components of computer system 1100 are interconnected using compute express link (CXL) interconnects.

Embodiments presented herein can allow for a sequence of ephemeral key sets to be generated to be used to perform various cryptographic operations.

Figure 12:
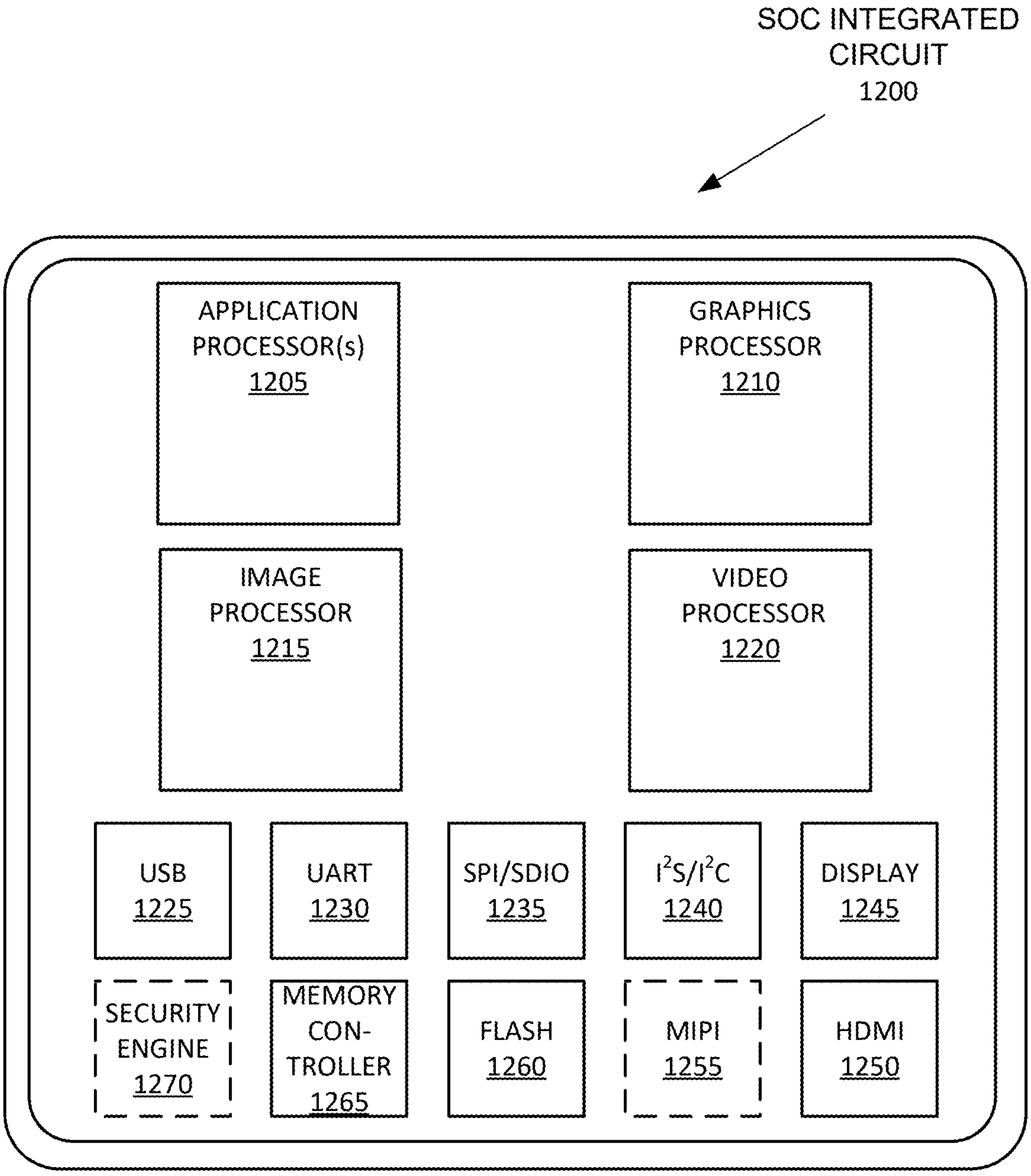
FIG. 12 illustrates an exemplary integrated circuit and associated graphics processors, according to at least one embodiment.

FIG. 12 is a block diagram illustrating an exemplary system on a chip integrated circuit 1200 that may be fabricated using one or more IP cores, according to at least one embodiment. In at least one embodiment, integrated circuit 1200 includes one or more application processor(s) 1205 (e.g., CPUs), at least one graphics processor 1210, and may additionally include an image processor 1215 and/or a video processor 1220, any of which may be a modular IP core. In at least one embodiment, integrated circuit 1200 includes peripheral or bus logic including a USB controller 1225, a UART controller 1230, an SPI/SDIO controller 1235, and an $I^2S/I^2C$ controller 1240. In at least one embodiment, integrated circuit 1200 can include a display device 1245 coupled to one or more of a high-definition multimedia interface (HDMI) controller 1250 and a mobile industry processor interface (MIPI) display interface 1255. In at least one embodiment, storage may be provided by a flash memory subsystem 1260 including flash memory and a flash memory controller. In at least one embodiment, a memory interface may be provided via a memory controller 1265 for access to SDRAM or SRAM memory devices. In at least one embodiment, some integrated circuits additionally include an embedded security engine 1270.

Embodiments presented herein can allow for a sequence of ephemeral key sets to be generated to be used to perform various cryptographic operations.

At least one embodiment of the disclosure can be described in view of the following clauses:

1. A system, comprising:

one or more processing units to generate, for each of a sequence of key rotations, a new set of ephemeral keys using a randomly-generated nonce and a current derivation key of a previously-derived set of ephemeral keys, the randomly-generated nonce being transmitted from a software agent executing on a secure processor in a computing device to a secure key unwrap engine implemented in hardware of the computing device, the software agent and the secure key unwrap engine both having a copy of the previously-derived set of ephemeral keys to use to generate the new set of ephemeral keys.

2. The system of clause 1, wherein an initial set of ephemeral keys is generated using a pairing key.

3. The system of clause 1, wherein the randomly-generated nonce is signed using a new ephemeral message key of the new set of keys.

4. The system of clause 3, wherein the secure key unwrap engine is further to verify that a signature on a message including the randomly-generated nonce matches a signature generated by the secure key unwrap engine, using a new local ephemeral message key generated using the current ephemeral derivation key and the randomly-generated nonce, before validating the new set of ephemeral keys for use until a next key rotation.

5. The system of clause 4, wherein the one or more processing units are further to invalidate the previously-derived set of ephemeral keys in response to the new set of ephemeral keys being validated.

6. The system of clause 1, wherein a current ephemeral derivation key is allowed to be used, with a newly-generated nonce, to derive a new set of ephemeral keys for each key rotation to be performed with respect to the secure key unwrap engine.

7. The system of clause 1, wherein ephemeral derivation keys are to be stored without use until a time of key rotation, wherein the ephemeral derivation keys are unable to be intercepted or inferred before the time of key rotation.

8. The system of clause 1, wherein the one or more processors are further to apply a count from a monotonic counter to each of a sequence of messages, wherein the messages are only able to be processed in sequence according to the count with no repetition in count value permitted.

9. The system of clause 1, wherein each of a cluster of secure key unwrap engines share the shared secret, and wherein a second message containing a newly-generated nonce is allowed to be broadcast to the secure key unwrap engines of the cluster.

10. The system of clause 1, wherein the one or more processing units are further to use a current ephemeral wrapping key to wrap a session key to be delivered to an external recipient.

11. At least one processor, comprising:

one or more logical units to:

derive, in a software agent executing on a secure processor in a computing device, an initial set of ephemeral keys using a shared secret and a generated nonce;

transmit a first message containing the generated nonce to a secure key unwrap engine implemented in hardware of the computing device and having a local copy of the shared secret;

derive, in the secure key unwrap engine, the set of ephemeral keys using the shared secret and the generated nonce;

use a current ephemeral wrapping key, of the set of ephemeral keys, to encrypt data to be transmitted while the initial set of ephemeral keys is valid;

derive, in the software agent and in response to a request to perform a key rotation, a new set of ephemeral keys using a newly-generated nonce and an initial ephemeral derivation key of the initial set of ephemeral keys; and transmit a second message containing the newly-generated nonce to the secure key unwrap engine, wherein the secure key unwrap engine is able to derive the new set of ephemeral keys using the newly-generated nonce and a locally-stored instance of the initial ephemeral derivation key.

12. The at least one processor of clause 11, wherein the one or more logical units are further to sign the second message using a new signature generated using a new ephemeral message key of the new set of ephemeral keys, and wherein the new signature is validated for use if a local signature generated by the secure key unwrap engine using a new local ephemeral message key of the new set matches the new signature on the second message.

13. The at least one processor of clause 11, wherein the shared secret is a pairing key.

14. The at least one processor of clause 11, wherein the generated nonce is a numerical string of specified length generated using a random number generator.

15. The at least one processor of clause 11, wherein the one or more logical units are further to invalidate the initial set of ephemeral keys in response to the new set of ephemeral keys being validated.

16. The at least one processor of clause 11, wherein a current ephemeral derivation key is allowed to be used, with a newly-generated nonce, to derive a new set of ephemeral keys for each key rotation to be performed with respect to the secure key unwrap engine.

17. The at least one processor of clause 11, wherein the at least one processor is comprised in at least one of:

a system for performing simulation operations;

a system for performing simulation operations to test or validate autonomous machine applications;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

18. A computer-implemented method, comprising:

deriving, in a software agent executing on a secure processor in a computing device, an initial set of ephemeral keys using a shared secret and a generated nonce;

transmitting a first message containing the generated nonce to a secure key unwrap engine implemented in hardware of the computing device and having a local copy of the shared secret;

deriving, in the secure key unwrap engine, the set of ephemeral keys using the shared secret and the generated nonce;

using a current ephemeral wrapping key, of the set of ephemeral keys, to encrypt data to be transmitted while the initial set of ephemeral keys is valid;

deriving, in the software agent and in response to a request to perform a key rotation, a new set of ephemeral keys using a newly-generated nonce and an initial ephemeral derivation key of the initial set of ephemeral keys; and transmitting a second message containing the newly-generated nonce to the secure key unwrap engine, wherein the secure key unwrap engine is able to derive the new set of ephemeral keys using the newly-generated nonce and a locally-stored instance of the initial ephemeral derivation key.

19. The computer-implemented method of clause 18, further comprising:

signing the second message using a new signature generated using a new ephemeral message key of the new set of ephemeral keys; and validating the new set of ephemeral keys for use if the new signature matches a new local signature generated by the secure key unwrap engine using a new local ephemeral message key.

20. The computer-implemented method of clause 18, further comprising:

applying a count from a monotonically increasing clock to each transmitted message; and processing messages only in order according to the applied count.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory and/or secondary storage. Computer programs, if executed by one or more processors, enable a system to perform various functions in accordance with at least one embodiment. In at least one embodiment, memory, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of a CPU, parallel processing system, an integrated circuit capable of at least a portion of capabilities of both CPU, parallel processing system, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, a computer system may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:

one or more processing units to generate, for each of a sequence of key rotations, a new set of ephemeral keys using a randomly-generated nonce and a current derivation key of a previously-derived set of ephemeral keys, the randomly-generated nonce being transmitted from a software agent executing on a secure processor in a computing device to a secure key unwrap engine implemented in hardware of the computing device, the software agent and the secure key unwrap engine both having a copy of the previously-derived set of ephemeral keys to use to generate the new set of ephemeral keys.

2. The system of claim 1, wherein an initial set of ephemeral keys is generated using a pairing key.

3. The system of claim 1, wherein the randomly-generated nonce is signed using a new ephemeral message key of the new set of keys.

4. The system of claim 3, wherein the secure key unwrap engine is further to verify that a signature on a message including the randomly-generated nonce matches a signature generated by the secure key unwrap engine, using a new local ephemeral message key generated using a current ephemeral derivation key and the randomly-generated nonce, before validating the new set of ephemeral keys for use until a next key rotation.

5. The system of claim 4, wherein the one or more processing units are further to invalidate the previously-derived set of ephemeral keys in response to the new set of ephemeral keys being validated.

6. The system of claim 1, wherein a current ephemeral derivation key is allowed to be used, with a newly-generated nonce, to derive a new set of ephemeral keys for each key rotation to be performed with respect to the secure key unwrap engine.

7. The system of claim 1, wherein ephemeral derivation keys are to be stored without use until a time of key rotation, wherein the ephemeral derivation keys are unable to be intercepted or inferred before the time of key rotation.

8. The system of claim 1, wherein the one or more processing units are further to apply a count from a monotonic counter to each of a sequence of messages, wherein the messages are only able to be processed in sequence according to the count with no repetition in count value permitted.

9. The system of claim 1, wherein each of a cluster of secure key unwrap engines share the shared secret, and wherein a second message containing a newly-generated nonce is allowed to be broadcast to the secure key unwrap engines of the cluster.

10. The system of claim 1, wherein the one or more processing units are further to use a current ephemeral wrapping key to wrap a session key to be delivered to an external recipient.

11. At least one processor, comprising:

one or more logical units to:

derive, in a software agent executing on a secure processor in a computing device, an initial set of ephemeral keys using a shared secret and a generated nonce;

transmit a first message containing the generated nonce to a secure key unwrap engine implemented in hardware of the computing device and having a local copy of the shared secret;

derive, in the secure key unwrap engine, the initial set of ephemeral keys using the shared secret and the generated nonce;

use a current ephemeral wrapping key, of the initial set of ephemeral keys, to encrypt data to be transmitted while the initial set of ephemeral keys is valid;

derive, in the software agent and in response to a request to perform a key rotation, a new set of ephemeral keys using a newly-generated nonce and an initial ephemeral derivation key of the initial set of ephemeral keys; and transmit a second message containing the newly-generated nonce to the secure key unwrap engine, wherein the secure key unwrap engine is able to derive the new set of ephemeral keys using the newly-generated nonce and a locally-stored instance of the initial ephemeral derivation key.

12. The at least one processor of claim 11, wherein the one or more logical units are further to sign the second message using a new signature generated using a new ephemeral message key of the new set of ephemeral keys, and wherein the new signature is validated for use if a local signature generated by the secure key unwrap engine using a new local ephemeral message key of the new set matches the new signature on the second message.

13. The at least one processor of claim 11, wherein the shared secret is a pairing key.

14. The at least one processor of claim 11, wherein the generated nonce is a numerical string of specified length generated using a random number generator.

15. The at least one processor of claim 11, wherein the one or more logical units are further to invalidate the initial set of ephemeral keys in response to the new set of ephemeral keys being validated.

16. The at least one processor of claim 11, wherein a current ephemeral derivation key is allowed to be used, with a newly-generated nonce, to derive a new set of ephemeral keys for each key rotation to be performed with respect to the secure key unwrap engine.

17. The at least one processor of claim 11, wherein the at least one processor is comprised in at least one of:

a system for performing simulation operations;

a system for performing simulation operations to test or validate autonomous machine applications;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

18. A computer-implemented method, comprising:

deriving, in a software agent executing on a secure processor in a computing device, an initial set of ephemeral keys using a shared secret and a generated nonce;

transmitting a first message containing the generated nonce to a secure key unwrap engine implemented in hardware of the computing device and having a local copy of the shared secret;

deriving, in the secure key unwrap engine, the initial set of ephemeral keys using the shared secret and the generated nonce;

using a current ephemeral wrapping key, of the initial set of ephemeral keys, to encrypt data to be transmitted while the initial set of ephemeral keys is valid;

deriving, in the software agent and in response to a request to perform a key rotation, a new set of ephemeral keys using a newly-generated nonce and an initial ephemeral derivation key of the initial set of ephemeral keys; and transmitting a second message containing the newly-generated nonce to the secure key unwrap engine, wherein the secure key unwrap engine is able to derive the new set of ephemeral keys using the newly-generated nonce and a locally-stored instance of the initial ephemeral derivation key.

19. The computer-implemented method of claim 18, further comprising:

signing the second message using a new signature generated using a new ephemeral message key of the new set of ephemeral keys; and validating the new set of ephemeral keys for use if the new signature matches a new local signature generated by the secure key unwrap engine using a new local ephemeral message key.

20. The computer-implemented method of claim 18, further comprising:

applying a count from a monotonically increasing clock to each transmitted message; and processing messages only in order according to the applied count.

* * * * *